(12) United States Patent
Wang et al.

(10) Patent No.: US 12,289,198 B2
(45) Date of Patent: Apr. 29, 2025

(54) NETWORK PERFORMANCE MONITORING AND FAULT MANAGEMENT BASED ON WIDE AREA NETWORK LINK HEALTH ASSESSMENTS

(71) Applicant: Juniper Networks, Inc., Sunnyvale, CA (US)

(72) Inventors: Jisheng Wang, Palo Alto, CA (US); Xiaoying Wu, Sunnyvale, CA (US); Amit Pillay, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 480 days.

(21) Appl. No.: 17/554,928

(22) Filed: Dec. 17, 2021

(65) Prior Publication Data

US 2023/0070701 A1    Mar. 9, 2023

Related U.S. Application Data

(60) Provisional application No. 63/247,103, filed on Sep. 22, 2021, provisional application No. 63/239,223, filed on Aug. 31, 2021.

(51) Int. Cl.
*H04L 41/0686* (2022.01)
*H04L 41/0631* (2022.01)
(Continued)

(52) U.S. Cl.
CPC ...... *H04L 41/0686* (2013.01); *H04L 41/0631* (2013.01); *H04L 41/5012* (2013.01); *H04L 45/22* (2013.01)

(58) Field of Classification Search
CPC ............ H04L 41/0631; H04L 41/0654; H04L 41/0677; H04L 41/0686; H04L 41/142;
(Continued)

(56) References Cited

U.S. PATENT DOCUMENTS 5,559,955 A * 9/1996 Dev .................... H04L 43/0817
714/4.12
8,661,295 B1    2/2014 Khanna et al.
(Continued)

FOREIGN PATENT DOCUMENTS

EP    3389220 A1    10/2018
EP    3700133 A1    8/2020

OTHER PUBLICATIONS

U.S. Appl. No. 18/063,591, filed Dec. 8, 2022, naming inventors Pillay et al.
(Continued)

*Primary Examiner* — Noel R Beharry
*Assistant Examiner* — Angelie T Ngo
(74) *Attorney, Agent, or Firm* — Shumaker & Sieffert, P.A.

(57) ABSTRACT

Techniques are described for monitoring network performance and managing network faults in a computer network. A cloud-based network management system stores path data received from a plurality of network devices operating as network gateways for an enterprise network, the path data collected by each network device of the plurality of network devices for one or more logical paths of a physical interface from the network device over a wide area network (WAN). The network management system determines, based on the path data, one or more WAN link health assessments, wherein the one or more WAN link health assessments include a success or failure state associated with one or more of service provider reachability, physical interface operation, or logical path performance; and in response to determining the at least one failure state, outputs a notification including identification of a root cause of the at least one failure state.

20 Claims, 17 Drawing Sheets

(51) Int. Cl.
*H04L 41/5009* (2022.01)
*H04L 45/00* (2022.01)

(58) Field of Classification Search
CPC . H04L 41/16; H04L 41/5009; H04L 41/5012; H04L 41/5025; H04L 45/22; H04L 43/08; H04L 43/0811; H04L 43/0847; H04L 43/16
See application file for complete search history.

(56) References Cited

U.S. PATENT DOCUMENTS

| | | | |
|---|---|---|---|
| 9,369,550 B2* | 6/2016 | Sung | H04L 63/162 |
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,769,044 B1* | 9/2017 | Cirkovic | H04L 43/0852 |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,771,434 B1 | 9/2020 | Srinath et al. | |
| 10,992,543 B1 | 4/2021 | Rachamadugu et al. | |
| 10,999,182 B2 | 5/2021 | Kaplan et al. | |
| 11,075,824 B2 | 7/2021 | McCulley et al. | |
| 11,153,202 B2 | 10/2021 | Kaplan et al. | |
| 11,165,863 B1 | 11/2021 | Timmons et al. | |
| 11,329,912 B2 | 5/2022 | Kaplan et al. | |
| 11,451,464 B2 | 9/2022 | Kaplan et al. | |
| 2006/0095815 A1 | 5/2006 | Noy et al. | |
| 2010/0063871 A1 | 3/2010 | Merrifield, Jr. | |
| 2011/0274119 A1* | 11/2011 | Golovchenko | H04L 25/14 370/465 |
| 2020/0136890 A1 | 4/2020 | To et al. | |
| 2020/0213236 A1 | 7/2020 | Safavi | |
| 2020/0313979 A1* | 10/2020 | Kumaran | H04L 41/16 |
| 2020/0351149 A1* | 11/2020 | Yan | H04L 41/0654 |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0374182 A1 | 11/2020 | Kolodner | |
| 2020/0403855 A1 | 12/2020 | Sarood | |
| 2020/0403890 A1 | 12/2020 | McCulley et al. | |
| 2021/0097411 A1* | 4/2021 | Guntur | G06N 20/20 |
| 2022/0271832 A1* | 8/2022 | Choquette | H04B 7/18519 |
| 2022/0393981 A1 | 12/2022 | Solanki et al. | |
| 2023/0011452 A1 | 1/2023 | Barber | |
| 2023/0231785 A1* | 7/2023 | Kumar | H04L 41/0631 709/224 |

OTHER PUBLICATIONS

"Troubleshoot Citrix SD-WAN Issues Using ARP Table", Citrix Support Knowledge Center [online]. Retrieved from the Internet: <https://support.citrix.com/article/CTX236828> Aug. 2, 2018, 2 pp.

"Your ISP's DHCP does not function properly. DHCP Failure. ASUS RT-AC86U @Comcastche", Xfinity Community Forum [online]. Retrieved from the Internet: <https://forums.xfinity.com/conversations/your-home-network/your-isps-dhcp-does-not-function-properly-dhcp-failure-asus-rtac86u-comcastche/602daf9ec5375f08cd11d6a4> Jul. 26, 2020, 3 pp.

"WAN Connection Detection", Dray Tek [online]. Retrieved from the Internet: <https://www.draytek.co.uk/support/guides/kb-connection-detection> Jul. 1, 2016, 5 pp.

"Dual ISP failover with RPM ip-monitoring", RtoDto.net [online]. Retrieved from the Internet: <https://rtodto.net/dual-isp-failover-with-rpm-ip-monitoring/> Nov. 10, 2014, 17 pp.

"Connection Monitoring for WAN Failover", cisco Meraki [online]. Retrieved from the Internet: <https://documentation.meraki.com/MX/Firewall_and_Traffic_Shaping/Connection_Monitoring_for_WAN_Failover> Feb. 19, 2021, 3 pp.

"Technical Note: Detecting a link failure using Dead Gateway Detection (ping server) to ensure a link fail over", Fortinet Forum [online]. Retrieved from the Internet: <https://community.fortinet.com/t5/FortiGate/Technical-Note-Detecting-a-link-failure-using-Dead-Gateway/ta-p/190912?externalId=FD30626> edited on Dec. 16, 2021, 5 pp.

Response to Extended Search Report dated Dec. 21, 2022, from counterpart European Application No. 22184513.4, filed Sep. 1, 2023, 18 pp.

Extended Search Report from counterpart European Application No. 22184513.4 dated Dec. 21, 2022, 10 pp.

Communication pursuant to Article 94(3) EPC from counterpart European Application No. 22184513.4 dated Jul. 31, 2024, 10 pp.

Response to Communication pursuant to Article 94(3) EPC dated Jul. 31, 2024, from counterpart European Application No. 22184513.4 filed Jan. 15, 2025, 21 pp.

* cited by examiner

NETWORK PERFORMANCE MONITORING AND FAULT MANAGEMENT BASED ON WIDE AREA NETWORK LINK HEALTH ASSESSMENTS

This application claims the benefit of U.S. Provisional Patent Application No. 63/247,103, filed Sep. 22, 2021, and U.S. Provisional Patent Application No. 63/239,223, filed Aug. 31, 2021, the entire content of each application is incorporated herein by reference.

TECHNICAL FIELD

This disclosure generally relates to computer networks and, more specifically, monitoring and/or managing network performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for monitoring network performance and managing network faults that may impact user experiences in an enterprise network based on path data received from one or more network devices operating as network gateways for the enterprise network. A cloud-based network management system (NMS) receives the path data from the network devices. The path data is indicative of one or more aspects of network performance as monitored on each logical path between network devices over a wide area network (WAN), e.g., a broadband network, Long Term Evolution (LTE) network, or Multi-protocol Label Switching (MPLS) network. The NMS includes a WAN link health Service Level Expectation (SLE) metric engine that determines one or more WAN link health assessments based on the path data received from the network devices. Based on the WAN link health assessments, the NMS may identify success or failure states associated with the WAN link interface and/or path, identify a root cause of the one or more failure states, and/or automatically recommend or invoke one or more remedial actions to address the identified failure states.

A given network device may establish multiple logical paths (e.g., peer paths or tunnels) over the WAN with multiple other network devices on a single physical interface. Each of the network devices may include a software agent or other module configured to report path data collected at a logical path level to the NMS in the cloud and/or the path data may be retrieved from the network devices by the NMS via an application programming interface (API) or an open configuration protocol. The cloud-based NMS may store the path data received from the network devices over time and, thus, provide a network performance history of the network devices.

In examples where the network devices comprise session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may be retrieved by the NMS via an API or an open configuration protocol or the tunnel data may be reported to the NMS by a software agent or other module running on the packet-based router.

According to the disclosed techniques, the WAN link health SLE metric engine is configured to monitor the health condition of the logical paths from the network devices over the WAN, and detect network failures and performance degradation that may impact user experiences. The WAN link health SLE metric engine uses a measurement unit of a user-path-minute to measure a health state (e.g., success vs failure) for each user of each logical path each minute, which is multiplied by the number of active users passing traffic through each path during that time interval as a user impact measurement. The WAN link health SLE metric engine may aggregate the path data received from the network devices over a selected period of time (e.g., today, last 7 days, etc.) and at a selected granularity-level (e.g., site-level or network device-level). The WAN link health SLE metric engine may determine a success or failure state associated with one or more of service provider reachability, physical interface operation, or logical path performance based on the aggregated path data, and classify the determined failure states. Some examples of failure conditions, i.e., what conditions should be considered as failed user-path-minutes, are as follows: Internet Service Provider (ISP) unreachability, logical path down, logical path performance degradation, interface over-subscription, interface errors, and weak/unstable interface signal strength.

The techniques of the disclosure provide one or more technical advantages and practical applications. The techniques enable the cloud-based NMS to automatically monitor and quantify a health state of a WAN link (e.g., a physical interface and/or a logical path) based on received path data from network devices over time. For example, the NMS may store the path data in a micro-services cloud infrastructure with no scaling limits. As such, the stored path data may provide a network performance history of the network devices, which may enable the WAN link health SLE metric engine to identify performance degradations and/or network failures that may not be detectable from assessments based on a shorter "snapshots" of path data, e.g., performed by the network devices themselves.

In addition, the NMS may provide user visibility into WAN link health for the enterprise network by generating and outputting notifications including identification of a root cause of any identified failure states. For example, the NMS may generate data representative of a user interface for display on a user interface device, e.g., operated by a network administrator of the enterprise network. The user interface may present results of a root cause analysis including classifiers of the determined failure states along with a timeline of the failed user-path-minutes for each of the classifiers over a selected period of time and at a selected granularity level (e.g., site-level or network device-level).

The NMS may further generate and output notifications, e.g., to the network administrator of the enterprise network, with recommendations to perform one or more remedial actions to address the determined failure states. In other examples, the NMS may instead automatically invoke the one or more remedial actions to address the determined failure states.

In one example, the disclosure is directed to a network management system of an enterprise network, the network management system comprising a memory storing path data received from a plurality of network devices operating as network gateways for the enterprise network, the path data reported by each network device of the plurality of network devices for one or more logical paths of a physical interface from the given network device over a WAN, and one or more processors coupled to the memory. The one or more processors configured to determine, based on the path data, one or more WAN link health assessments, wherein the one or more WAN link health assessments include a success or failure state associated with one or more of service provider reachability, physical interface operation, or logical path performance; and in response to determining at least one failure state, output a notification including identification of a root cause of the at least one failure state.

In another example, the disclosure is directed to method comprising receiving, by a network management system of an enterprise network, path data from a plurality of network devices operating as network gateways for the enterprise network, the path data reported by each network device of the plurality of network devices for one or more logical paths of a physical interface from the given network device over a WAN; determining, by the network management system and based on the path data, one or more WAN link health assessments, wherein the one or more WAN link health assessments include a success or failure state associated with one or more of service provider reachability, physical interface operation, or logical path performance; and in response to determining at least one failure state, outputting, by the network management system, a notification including identification of a root cause of the at least one failure state.

In an additional example, the disclosure is directed to a computer-readable storage medium comprising instructions that, when executed, cause one or more processors of a network management system of an enterprise network to: receive path data from a plurality of network devices operating as network gateways for the enterprise network, the path data reported by each network device of the plurality of network devices for one or more logical paths of a physical interface from the given network device over a WAN; determine, based on the path data, one or more WAN link health assessments, wherein the one or more WAN link health assessments include a success or failure state associated with one or more of service provider reachability, physical interface operation, or logical path performance; and in response to determining at least one failure state, output a notification including identification of a root cause of the at least one failure state.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
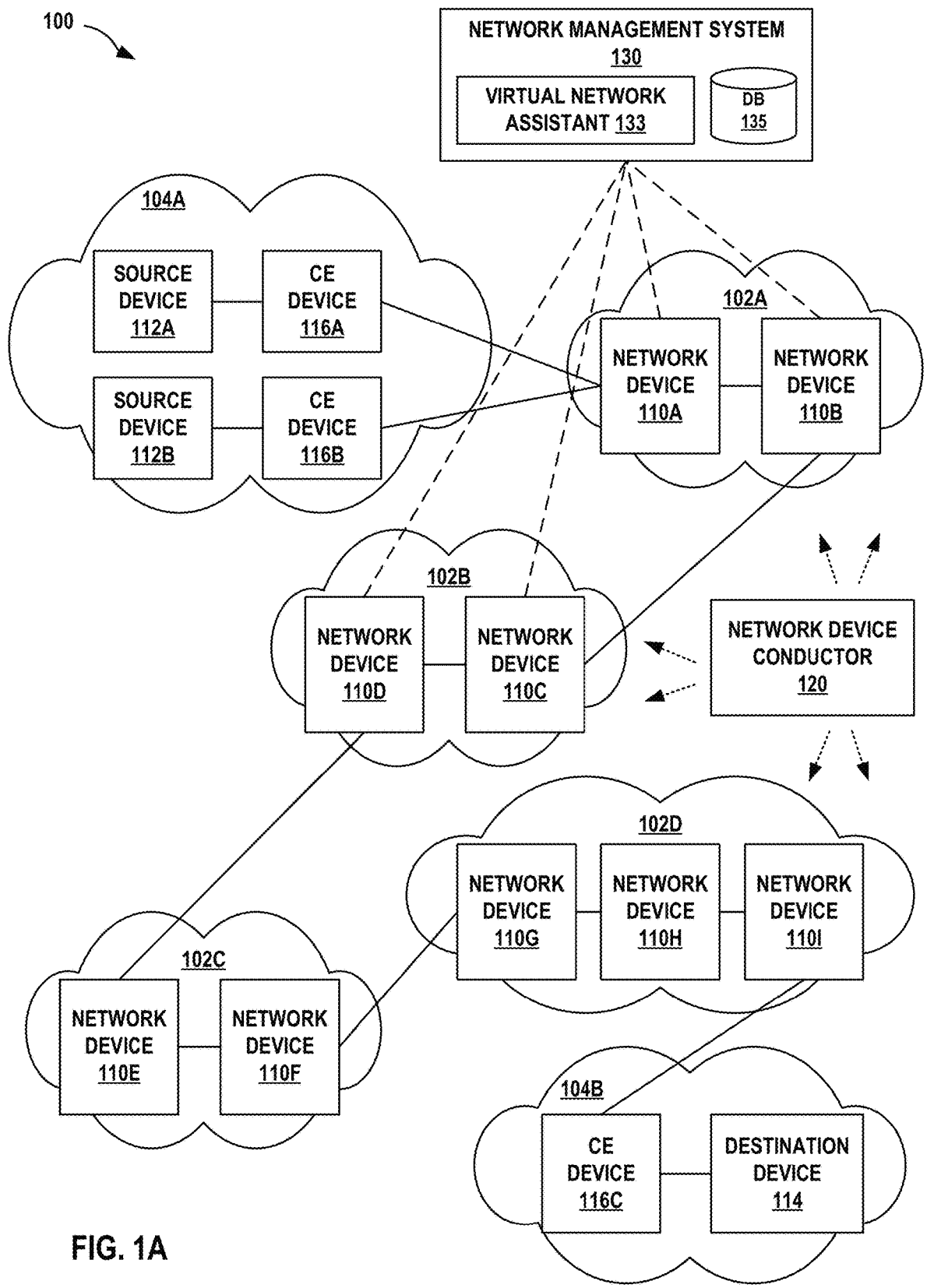
FIGS. 1A-1C are block diagrams illustrating example network systems including a network management system (NMS) is configured to monitor network performance and manage network faults in an enterprise network based on one or more WAN link health assessments, in accordance with one or more techniques of the disclosure.
Figure 1B:
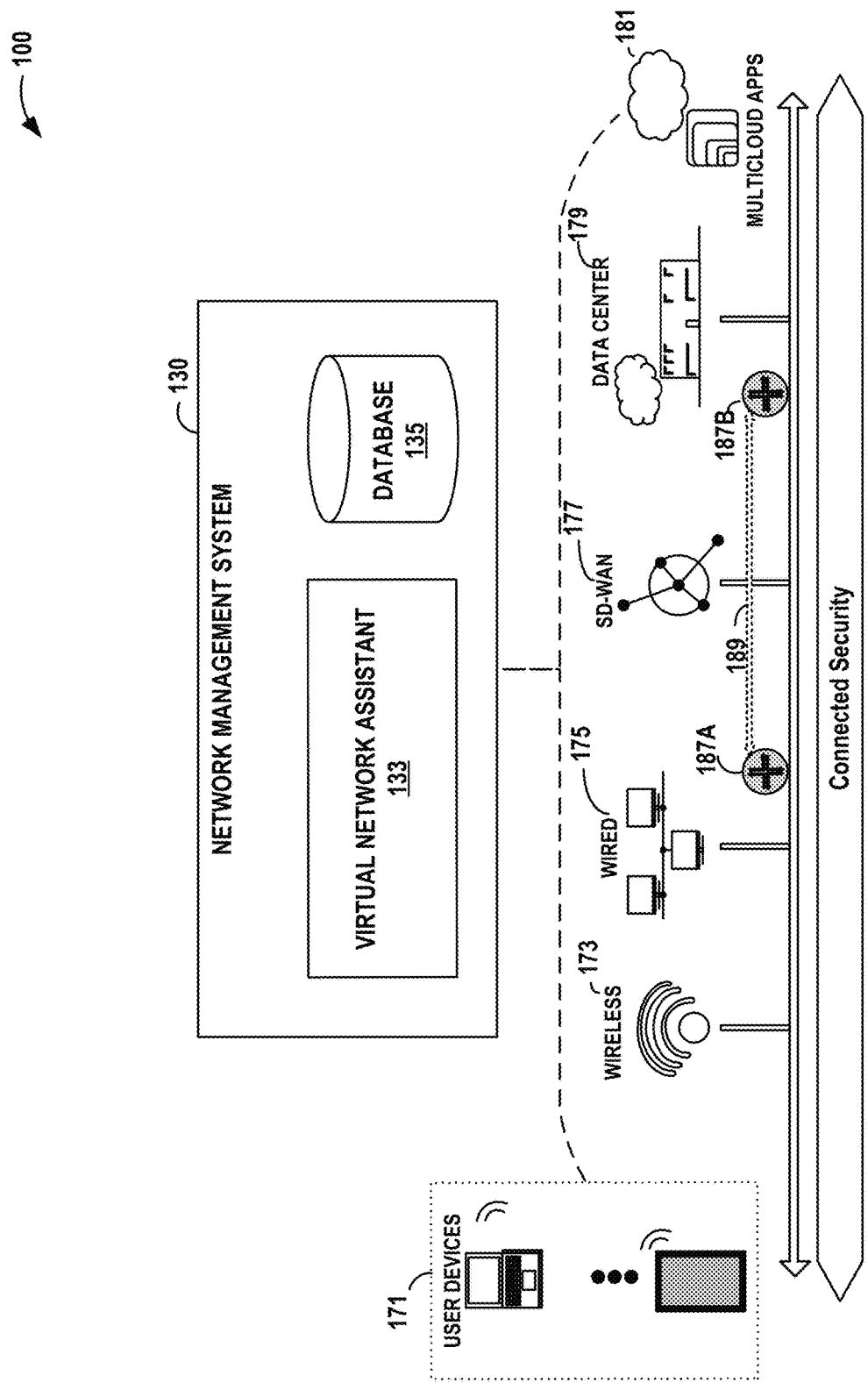
Figure 1C:
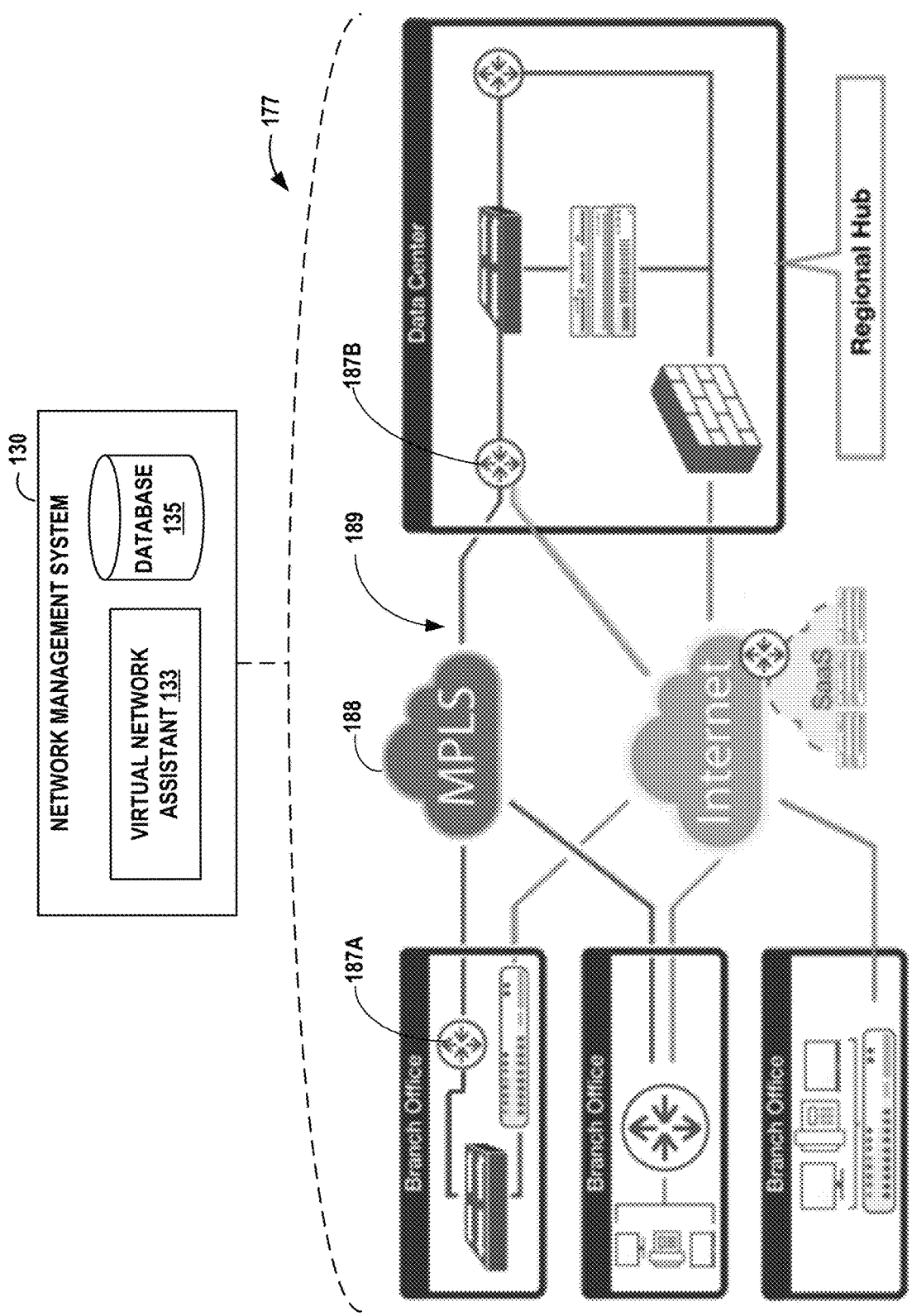

FIGS. 1A-1C are block diagrams illustrating example network systems 100 including a network management system (NMS) 130 is configured to monitor network performance and manage network faults in an enterprise network based on one or more WAN link health assessments, in accordance with one or more techniques of the disclosure.

FIG. 1A is a block diagram illustrating example network system 100 in accordance with the techniques of the disclosure. In the example of FIG. 1A, network system 100 includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100 is illustrated as including multiple interconnected networks 102, in other examples network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100 illustrated in FIG. 1A is merely an example. For example, network system 100 may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels, e.g., Internet Protocol security (IPsec) tunnels, over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each service provider network 102 may be considered to be a different "district," wherein each subdomain within each service provider network 102 may be considered to be a neighborhood within that district. In this example, each network device 110A and 110B within service provider network 102A may maintain service and topology state information only for one another, and not for network devices 110C-110I. Similarly, each network device 110D and 110C within service provider network 102B may maintain service and topology state information only for one another, and not for network devices 110A-110B or 110E-110I. In other examples, an administrator may assign one or more service provider networks 102 into one or more districts, one or more neighborhoods, or a combination of districts and neighborhoods as suits the needs of network system 100.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In accordance with the techniques of the disclosure, NMS 130 is configured to monitor network performance and manage network faults that may impact user experiences in an enterprise network (e.g., experiences of source devices 112 and/or destination device 114 in customer networks 104) based on path data received from one or more network devices 110 operating as network gateways for the enterprise network. NMS 130 receives the path data from network devices 110 and stores the path data received over time in database 135. The path data is indicative of one or more aspects of network performance as monitored on each logical path (e.g., peer path or tunnel) between network devices 110 over the WAN, e.g., a broadband network, Long Term Evolution (LTE) network, or Multi-protocol Label Switching (MPLS) network. NMS 130 includes virtual network assistant 133 having a WAN link health Service Level Expectation (SLE) metric engine that determines one or more WAN link health assessments based on the path data received from network devices 110. Based on the WAN link health assessments, NMS 130 may identify success or failure states associated with the WAN link interface and/or path, identify a root cause of the one or more failure states, and/or automatically recommend or invoke one or more remedial actions to address the identified failure states.

A given network device, e.g., network device 110A, may establish multiple logical paths (e.g., peer paths for a session-based router or tunnels for a packet-based router) on a single physical interface over the WAN with multiple other network devices, e.g., network device 110I. One or more of network devices 110A may include a software agent or other module configured to report path data collected at a logical path level to NMS 130. In other examples, the path data may be retrieved from one or more of network devices 110 by NMS 130 via an API or an open configuration protocol. The cloud-based NMS may store the path data received from the network devices over time and, thus, provide a network performance history of the network devices.

According to the disclosed techniques, NMS 130 is configured to monitor the health condition of the logical paths from network devices 110 over the WAN, and detect network failures and performance degradation that may impact user experiences. For example, the WAN link health SLE metric engine of virtual network assistant 133 uses a measurement unit of a user-path-minute to measure a health state (e.g., success vs failure) for each user of each logical path each minute, which is multiplied by the number of active users passing traffic through each path during that time interval as a user impact measurement. The WAN link health SLE metric engine may determine a success or failure state associated with one or more of service provider reachability, physical interface operation, or logical path performance based on the path data received from the network devices over time and stored in database 135, and classify the determined failure states. Some examples of failure conditions, i.e., what conditions should be considered as failed user-path-minutes, are as follows: Internet Service Provider (ISP) unreachability, logical path down, logical path performance degradation, interface over-subscription, interface errors, and/or weak/unstable interface signal strength.

The techniques of the disclosure provide one or more technical advantages and practical applications. The techniques enable the cloud-based NMS 130 to automatically monitor and quantify a health state of a WAN link (e.g., a physical interface and/or a logical path) based on received path data from network devices 110 over time. For example, the NMS may store the path data in database 135 having a micro-services cloud infrastructure with no scaling limits. As such, the stored path data may provide a network performance history of network devices 110, which may enable the WAN link health SLE metric engine of virtual network assistant 135 to identify performance degradations and/or network failures that may not be detectable from assessments based on a shorter "snapshots" of path data, e.g., as performed by the session-based network devices themselves.

In addition, NMS 130 may provide user visibility into WAN link health for the enterprise network by generating and outputting notifications including identification of a root cause of any identified failure states. For example, NMS 130 may generate data representative of a user interface for display on a user interface device, e.g., operated by a network administrator of one or more customer networks 104 of the enterprise network. The user interface may present results of a root cause analysis including classifiers of the determined failure states along with a timeline of the failed user-path-minutes for each of the classifiers. NMS 130 may further generate and output notifications, e.g., to the network administrator of the one or more customer networks 104 of the enterprise network, with recommendations to perform one or more remedial actions to address the determined failure states. In other examples, NMS 130 may instead automatically invoke the one or more remedial actions to address the determined failure states.

FIG. 1B is a block diagram illustrating further example details of network system 100 of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1B). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" routers 187A of edge wired networks 175 hosting wireless networks 173, such as branch or campus networks (e.g., customer networks 104 from FIG. 1 as sites of an enterprise network), to "hub" routers 187B further up the cloud stack toward cloud-based application services 181. Referring back to FIG. 1A, routers 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 171 to steer traffic along selected paths, e.g., peer path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 173, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 is configured to monitor network performance and manage network faults that may impact user experiences in the enterprise network based on path data received from one or more network devices operating as network gateways for the enterprise network (e.g., routers 187A, 187B). NMS 130 receives the path data from routers

187A, 187B that is indicative of one or more aspects of network performance as monitored on each logical path 189, e.g., peer path or tunnel, between routers 187A, 187B in SD-WAN 177 over an underlying physical WAN, and stores the path data in database 135 over time.

NMS 130 includes virtual network assistant 133 having a WAN link health SLE metric engine that determines one or more WAN link health assessments based on the path data in database 135. The WAN link health SLE metric engine may aggregate the path data over a selected period of time and at a selected granularity-level (e.g., site-level or network device-level). The WAN link health SLE metric engine may determine a success or failure state associated with one or more of service provider reachability, physical interface operation, or logical path performance based on the aggregated path data, and classify the determined failure states. Some examples of failure conditions, i.e., what conditions should be considered as failed user-path-minutes, are as follows: ISP unreachability, logical path down, logical path performance degradation, interface over-subscription, interface errors, and/or weak/unstable interface signal strength. Virtual network assistant 133 of NMS 130 may further identify a root cause of the one or more failure states and/or automatically recommend or invoke one or more remedial actions to address the identified failure states.

FIG. 1C is a block diagram illustrating further example details of network system 100 of FIG. 1B. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

In accordance with the techniques described in this disclosure, virtual network assistant 133 of NMS 130 has a WAN link health SLE metric engine configured to monitor the health condition of the logical paths from the spoke routers, e.g., logical path 189 from router 187A, and detect the network failures and performance degradation that may impact user experiences. The WAN link health SLE metric engine uses a measurement unit of a user-path-minute to measure a health state (e.g., success vs failure) for each user of each logical path each minute, which is multiplied by the number of active users passing traffic through each path during that time interval as a user impact measurement. The WAN link health SLE metric engine may aggregate path data received from network devices, e.g., routers 187A, 187B, over a selected period of time and at a selected granularity-level (e.g., site-level or network device-level). The WAN link health SLE metric engine may determine a success or failure state associated with one or more of service provider reachability, physical interface operation, or logical path performance based on the aggregated path data, and classify the determined failure states. Some examples of failure conditions, i.e., what conditions should be considered as failed user-path-minutes, are as follows: ISP unreachability, logical path down, logical path performance degradation, interface over-subscription, interface errors, and/or weak/unstable interface signal strength.

Several high-level design considerations are described herein. In some examples, the WAN link health SLE metric engine is configured to measure the health state for the logical path segment over WAN 188, which can be over broadband, LTE, or MPLS, between spoke router 187A in the branch office and hub router 187B in the data center, but may not measure the health state for the connection from the data center to the application servers or the health state for the application services themselves. In some examples, the WAN link health SLE metric engine is configured to measure the health state for the logical path segment from spoke routers, e.g., spoke router 187A in the branch office, but may not measure the health state for hub routers, e.g., hub router 187B in the data center.

The network devices may collect logical path statistics via bidirectional forwarding detection (BFD) probing, which is normally sent via a low-priority traffic class. As such, the logical path statistics may not always be representative of true user experiences at different application levels. For example, it is possible that a certain logical path may have low performance for a best effort traffic class and thus be determined as having bad or failed user-path-minutes, but the low performance for the best effort traffic class may not cause any true user impact since user application sessions are sent via a higher-priority traffic class. In some instances, this may result in a finding of "bad WAN Link Health SLE" but "good Application Health SLE." In addition, the network devices, e.g., session-based routers, may treat all available links (e.g., LTE, Broadband, or MPLS) as active and may monitor the logical path statistics over each link. As such, the WAN link health SLE metric engine may detect and report link failures even if there is no user traffic sent over a particular link during a failing interval.

Figure 2:
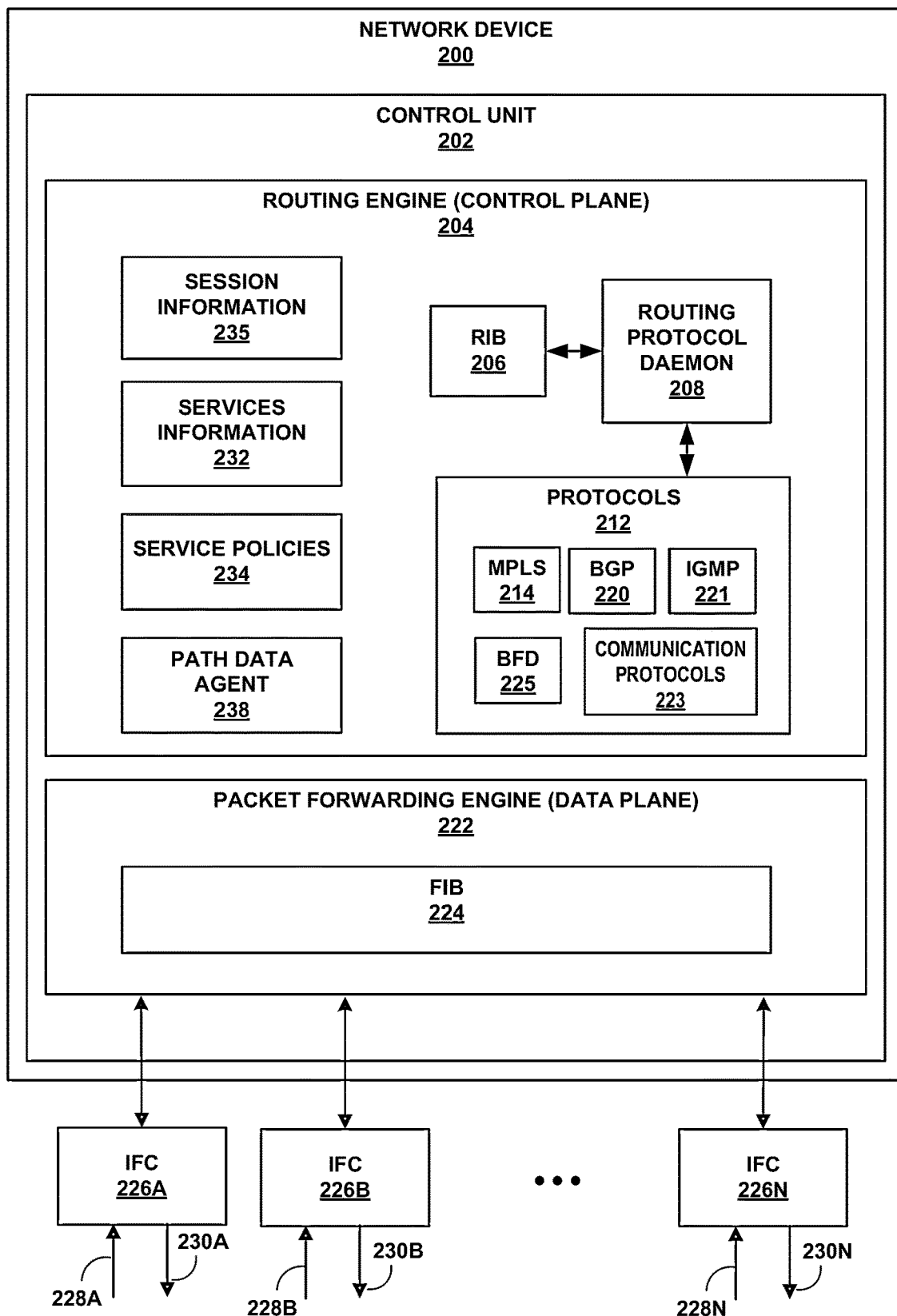
FIG. 2 is a block diagram illustrating an example network device, in accordance with the techniques of the disclosure.

FIG. 2 is a block diagram illustrating an example network device 200 in accordance with the techniques of the disclosure. In general, network device 200 may be an example of one of network devices 110 of FIG. 1A or one of routers 187A, 187B of FIGS. 1B and 1C. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing engine 204 and packet forwarding engine 222. Routing engine 204 operates as the control plane for network device 200 and includes an operating system that provides a multi-tasking operating environment for execution of a number of concurrent processes. Routing engine 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or IGMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1, and destined for another client device, e.g., destination device 114 of FIG. 1, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, the path data may include periodically-reported data and event-driven data. Control unit 202 of network device 200 is configured to collect logical path statistics via BFD 225 probing and data extracted from messages and/or counters at the logical path (e.g., peer path or tunnel) level. In some examples, control unit 202 is configured to collect statistics and/or sample other data according to a first periodic interval, e.g., every 3 seconds, every 5 seconds, etc. Control unit 202 may store the collected and sampled data as path data, e.g., in a buffer. In some examples, a path data agent 238 may periodically create a package of the statistical data according to a second periodic interval, e.g., every 3 minutes. The collected and sampled data periodically-reported in the package of statistical data may be referred to herein as "oc-stats." In some examples, the package of statistical data may also include details about clients connected to network device 200 and the associated client sessions. Path data agent 238 may then report the package of statistical data to NMS 130 in the cloud. In other examples, NMS 130 may request, retrieve, or otherwise receive the package of statistical data from network device 200 via an API, an open configuration protocol, or another of communication protocols 223. The package of statistical data created by path data agent 238 or another module of control unit 202 may include a header identifying network device 200 and the statistics and data samples for each of the logical paths from network device 200. In still other examples, the path data agent 238 reports event data to NMS 130 in the cloud in response to the occurrence of certain events at network device 200 as the events happen. The event-driven data may be referred to herein as "oc-events."

Figure 3:
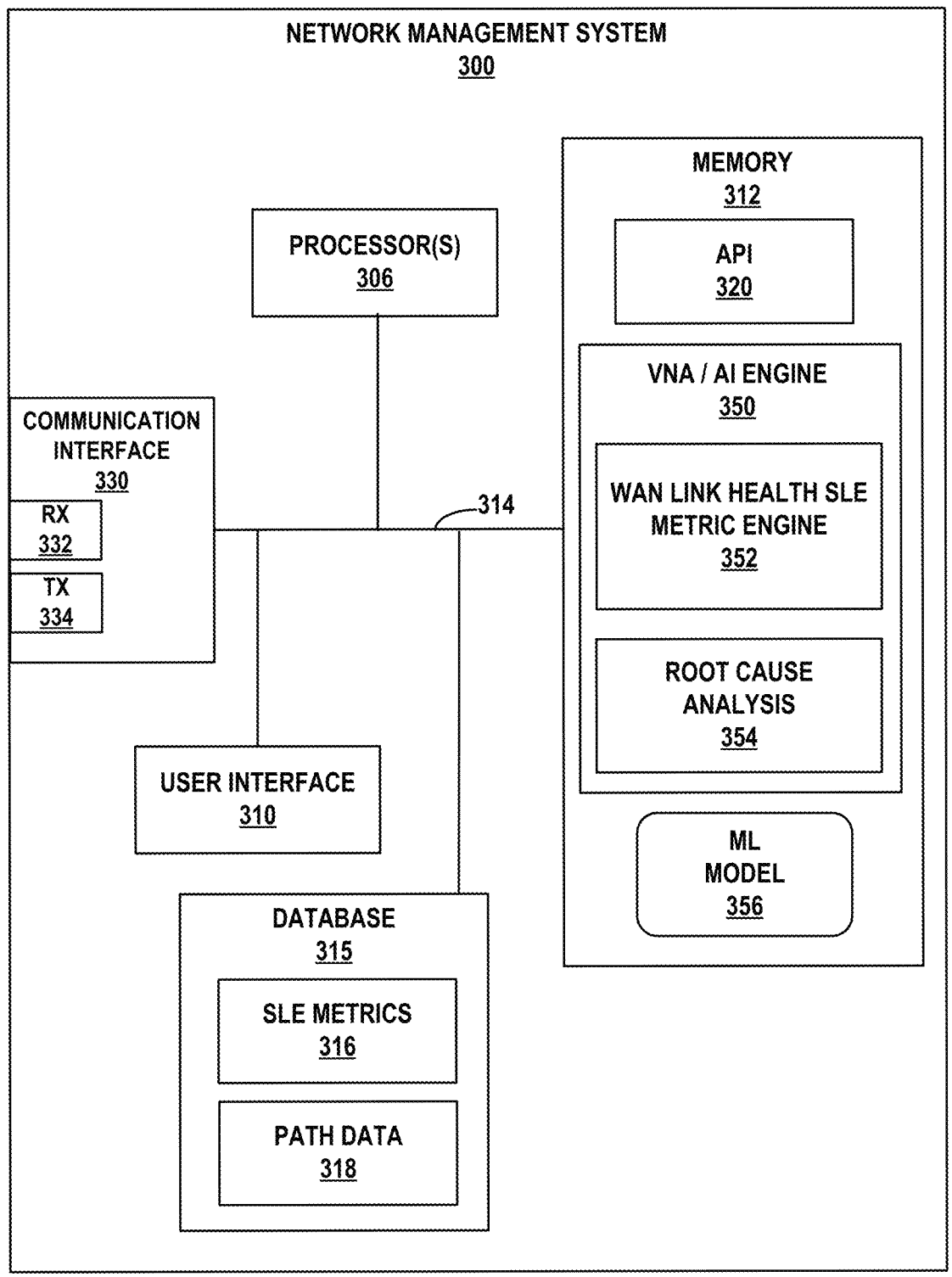
FIG. 3 is a block diagram illustrating an example network management system, in accordance with the techniques of the disclosure.

FIG. 3 shows an example network management system (NMS) 300 configured in accordance with one or more techniques of this disclosure. NMS 300 may be used to implement, for example, NMS 130 in FIGS. 1A-1C. In such examples, NMS 300 is responsible for monitoring and management of one or more of network devices 110A-110I of FIG. 1A of networks 102, routers 187A, 187B of FIGS. 1B-1C, or network device 200 of FIG. 2.

In this example, NMS 300 receives path data collected by network devices 110A-110N. The path data may comprise periodically-reported statistics and data samples at a logical path (e.g., peer path or tunnel) level, such as telemetry data and data extracted from messages and/or counters. In some examples, the path data may also include details about clients connected to the network devices 110. In further examples, the path data may include event-driven data that is reported in response to the occurrence of certain events at network devices 110. NMS 300 uses the path data to calculate one or more SLE metrics in order to monitor the health condition of the logical paths from network devices 110 over an underlying physical WAN, and detect network failures and performance degradation that may impact user experiences. In some examples, NMS 300 may be a server as part of a micro-services cloud infrastructure within or accessible by network system 100 of FIGS. 1A-1C.

In some examples, in addition to monitoring network devices 110, NMS 300 is also responsible for monitoring and management of one or more wireless or wired networks (e.g., wireless network 173 and wired LAN 175 of FIG. 1B), in addition to monitoring network devices of service providers or other networks. In this example, NMS 300 also receives data collected by access points from user equipment (e.g., user devices 171 of FIG. 1B), such as data used to calculate one or more SLE metrics, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface 310, a memory 312, and a database 318. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 102 as shown in FIG. 1, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1. The data and information received by NMS 300 may include, for example, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 220, a virtual network assistant (VNA)/AI engine 350 including a WAN link health SLE metric engine 352 and a root cause analysis engine 370, and an ML model 356. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

VNA/AI engine 350 analyzes path data 318 received from network devices 110 as well as its own data to identify when undesired or abnormal states are encountered in one of networks 102. For example, VNA/AI engine 350 may use root cause analysis module 354 to identify the root cause of any undesired or abnormal states. In some examples, root cause analysis module 354 utilizes artificial intelligence-based techniques to help identify the root cause of any poor SLE metric(s) at one or more of networks 102. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking API 320 to reboot one or more network devices 110. The corrective actions may further include restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain supervised and/or unsupervised ML model(s) 356 to event data (e.g., SLE metrics 316) to determine whether the collected network event data represents anomalous behavior that needs to be further analyzed by root cause analysis 354 of VNA/AI engine 350 to facilitate identification and resolution of faults. VNA/AI engine 350 may then apply the ML model 356 to data streams and/or logs of newly collected data (e.g., path data 318) of various network event types (e.g., connectivity events and/or statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 356 to path data 318 indicates that mitigation is required, VNA/AI engine 350 may invoke root cause analytics 354 to identify a root cause of the anomalous system behavior and, if possible, trigger automated or semi-automated corrective action. In this way, VNA/AI engine 350 may construct and apply a ML model 356 based on a particular complex network to determine whether to perform further, resource-intensive analysis on incoming streams of path data collected (e.g., in real-time) from network devices within the complex network system.

In accordance with the techniques of this disclosure, WAN link health SLE metric engine 352 enables set up and tracking of success or failure states associated with a WAN link interface and/or path for each network device 110 and/or each network 102. WAN link health SLE metric engine 352 further analyzes SLE-related data (i.e., path data 318) collected by network devices 110, such as any of network devices 110. For example, NMS 300 receives path data 318 from network devices 110 that is indicative of one or more aspects of network performance as monitored on each logical path, e.g., peer path or tunnel, between network devices 110 in an SD-WAN over an underlying physical WAN, and stores path data 318 in database 315 over time. Path data 318 may include periodically-reported data and event-driven data. For example, NMS 300 may receive path data 318 as a package of statistical data from each network device 110 on a periodic interval, e.g., every 3 minutes. The portion of path data 318 periodically reported in the package of statistical data may be referred to herein as "oc-stats." In some examples, the package of statistical data may also include details about clients connected to network devices 110 and the associated client sessions. The package of statistical data received from each network device 110 may include a header identifying the respective network device 110 and multiple statistics and data samples for each of the logical paths. In some examples, path data 318 may include event-driven data received from network devices 110 in response to the occurrence of certain events at network devices 110 as the events happen. The portion of path data 318 that includes event-driven data may be referred to herein as "oc-events." In some examples, NMS 300 may store path data 318 in a database having a micro-services cloud infrastructure with no scaling limits.

NMS 300 executes WAN link health SLE metric engine 352 to determine one or more WAN link health assessments based on path data 318. WAN link health SLE metric engine 352 may process the "oc-stats" data into "oc-stats-analytics" messages that include different fields used to calculate the classifiers and sub-classifiers of the WAN link health SLE metric. In addition, WAN link health SLE metric engine 352 may process the "oc-stats" data into "session-stats-analytics" messages that include the details about the clients connected to network devices 110 and the associated client sessions, which may be used to track the impact of deterioration of WAN link health on the connected clients. WAN link health SLE metric engine 352 may also process the "oc-events" data to identify the certain events used to calculate the classifiers and sub-classifiers of the WAN link health SLE metric. For example, WAN link health SLE metric engine 352 may be configured to identify DHCP_RESOLVED, DHCP_UNRESOLVED, ARP_RESOLVED, ARP_UNRESOLVED, PEER_PATH_UP, PEER_PATH_DOWN, IPSEC_TUNNEL_UP, and IPSEC_TUNNEL_DOWN events within the "oc-event" data received from network devices 110.

WAN link health SLE metric engine 352 uses a measurement unit of a user-path-minute to measure a health state (e.g., success vs failure) for each user of each logical path each minute, which is multiplied by the number of active users passing traffic through each path during that time interval as a user impact measurement. WAN link health SLE metric engine 352 may aggregate path data 318 over a selected period of time (e.g., today, last 7 days, etc.) and at a selected granularity-level (e.g., site-level or network device-level). WAN link health SLE metric engine 352 may determine a success or failure state associated with one or more of service provider reachability, physical interface operation, or logical path performance based on aggregated path data 318, and classify the determined failure states.

For example, WAN link health SLE metric engine 352 tracks whether the WAN link health assessments meet one or more failure conditions associated with service provider reachability, physical interface operation, or logical path performance. Some examples of failure conditions, i.e., what conditions should be considered as failed user-path-minutes, are as follows: ISP unreachability, logical path down, logical path performance degradation, interface oversubscription, interface errors, and/or weak/unstable interface signal strength.

The WAN link heath SLE metric may include one or more classifiers, and each of the classifiers may include one or more sub-classifiers. In response to determining at least one failure state, WAN link health SLE metric engine 352 may attribute the failure state to at least one of the classifiers and/or at least one of the sub-classifiers to further determine where the failure occurred. As described above, root cause analysis 354 may further determine a root cause of the failure state based on the at least one of the classifiers and/or the at least one of the sub-classifiers of the WAN link health SLE metric. VNA/AI engine 350 may output a notification including identification of the root cause of the failure state. In some scenarios, VNA/AI engine 350 may output the notification via a user interface for display on a user interface device of an administrator associated with the enterprise network. In some examples, the notification includes a recommendation to perform one or more remedial actions to address the root cause of the failure state identified in the notification. In other examples, VNA/AI engine 350 may automatically invoke one or more remedial actions to address the root cause of the failure state identified in the notification.

As one example, WAN link health SLE metric engine 352 is configured to determine a failure state associated with service provider reachability based on one or more address resolution protocol (ARP) failure events included in path data 318 received from network devices 110. WAN link health SLE metric engine 352 is further configured to determine a failure state associated with service provider reachability based on one or more dynamic host configuration protocol (DHCP) failure events included in path data 318 received from network devices 110. In response to determining the failure state associated with service provider reachability based on either ARP failure events or DHCP failure events over a period of time, root cause analysis module 354 identifies the service provider as the root cause of the failure state associated with the service provider reachability.

As another example, WAN link health SLE metric engine 352 is configured to determine an operation metric for a physical interface of a given network device 110 based on aggregated path data 318 for the one or more logical paths of the physical interface received from the given network device 110 over a period of time. WAN link health SLE metric engine 352 is further configured to determine a failure state associated with physical interface operation based on the operation metric meeting a threshold. In an example where the operation metric comprises an amount of bandwidth requested by a user of the given network device 110, WAN link health SLE metric engine 352 is configured to determine that the amount of bandwidth requested by the user meets an oversubscription threshold associated with a subscription level of the user. In response to determining the failure state associated with physical interface operation based on oversubscription over a period of time, root cause analysis module 354 identifies congestion as the root cause of the failure state associated with the physical interface operation.

In an example where the operation metric comprises a number of error packets on the physical interface to which a cable is connected, WAN link health SLE metric engine 352 is configured to determine that the number of error packets on the physical interface meets an error threshold. In response to determining the failure state associated with physical interface operation based on error packets over a period of time, root cause analysis module 354 identifies cable issues as the root cause of the failure state associated with the physical interface operation. In an example where the operation metric comprises a signal strength for the physical interface, WAN link health SLE metric engine 352 is configured to determine that the signal strength for the physical interface meets a weak signal or unstable signal threshold. In response to determining the failure state associated with physical interface operation based on weak or unstable signal over a period of time, root cause analysis module 354 identifies signal strength as the root cause of the failure state associated with the physical interface operation.

As an additional example, WAN link health SLE metric engine 352 is configured to determine a baseline for a performance metric for a logical path of a given network device 110 based on path data 318 for the logical path received from given network device 110 over a first period of time, wherein the performance metric comprises one of jitter, latency, or loss. WAN link health SLE metric engine 352 is further configured to determine a failure state associated with logical path performance based on the performance metric degrading from the baseline for the performance metric over a second period of time. In response to determining the failure state associated with logical path performance degradation over a period of time, root cause analysis module 354 identifies the one of jitter, latency, or loss as the root cause of the failure state associated with the logical path performance.

As a further example, WAN link health SLE metric engine 352 is configured to determine a failure state associated with logical path performance based on one or more logical path down events, e.g., peer path down events or IPsec tunnel down events, included in path data 318 received from network devices 110. In response to determining the failure state associated with logical path performance based on logical path down events over a period of time, root cause analysis module 354 identifies the logical path itself as the root cause of the failure state associated with the logical path performance. Further details on the data and analysis used to calculate each of the classifiers and sub-classifiers of the WAN link health SLE metric are described below with respect to FIG. 4.

Figure 4:
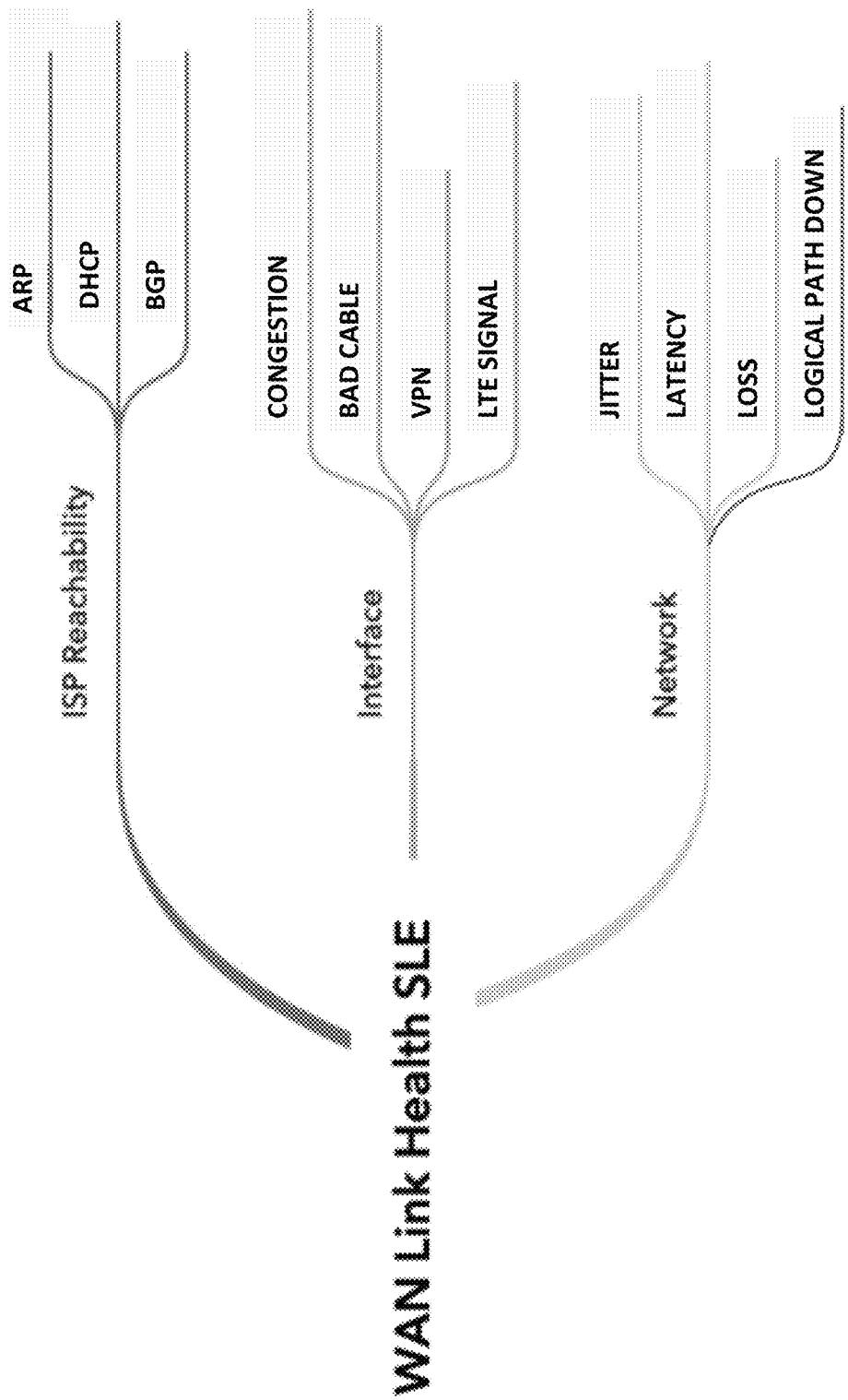
FIG. 4 is a conceptual diagram illustrating a structure of example WAN link health SLE metric classifiers and sub-classifiers, in accordance with the techniques of this disclosure.

FIG. 4 is a conceptual diagram illustrating a structure of example WAN link health SLE metric classifiers and sub-classifiers, in accordance with the techniques of this disclosure. The WAN Link Health SLE describes the health of individual WAN links used for communication with other devices. As illustrated, the WAN link health SLE metric includes classifiers: ISP reachability, Interface, and Network (i.e., logical path). The ISP reachability classifier may include sub-classifiers: ARP, DHCP, and BGP. The Interface classifier may include sub-classifiers: congestion, bad cable, VPN, and LTE signal. The Network interface classifier may include sub-classifiers: jitter, latency, loss, and logical path down (e.g., peer path down or IPsec tunnel down).

As described above, the WAN link health SLE metric engine tracks whether the WAN link health assessments meet one or more failure conditions associated with each of the classifiers. Some examples of the failure conditions are described in Table 1, below.

TABLE 1

| Failure Condition | Description | Detection | Classifier/Sub-Classifier |
|---|---|---|---|
| Unreachable | Spoke router broadband link fails to reach next-hop ISP Gateway due to different reasons including ARP, DHCP and BGP. This may not have direct user impact since network device may route user traffic to other available links like LTE. | Event Based | Unreachable; ARP/DHCP/BGP |
| Logical Path Down | Spoke or hub router logical path (e.g., peer path or IPsec tunnel) is down. | Event Based | Network Issues; Logical Path Down |

TABLE 1-continued

| Failure Condition | Description | Detection | Classifier/Sub-Classifier |
|---|---|---|---|
| Logical Path Performance Degradation | The performance of a certain peer path, e.g., jitter, latency, loss, degrade over a reasonable range from its baseline. This may or may not have direct user experience impact. | Baseline and Anomaly Detection | Network Issues; Jitter/Latency/Loss |
| Over-subscription | User subscribes for 100 Mbps download broad band circuit, but is trying to download 200 Mbps across different clients. Some clients will receive their data perfectly fine without loss, but other will be throttled. | Threshold Based | Interface Issues; Congestion |
| Interface Errors | Different types of interface errors (e.g., rx_errors, rx_fcserrors, rx_mtuerrors etc) observed due to cable issues. | Threshold Based | Interface Issues; Bad Cable |
| Weak/Unstable LTE Link Signal Strength | Weak or unstable signal strength and SNR for LTE interface. | Threshold Based | Interface Issues; LTE Signal Strength |

As discussed above with respect to FIG. 3, WAN link health SLE metric engine 352 of NMS 300 is configured to monitor the WAN link health at the physical interface level and detect physical interface-level issues. In some examples, the interface classifier is further classified into three sub-classifiers: congestion, cable issues and LTE Signal.

In order to calculate the congestion sub-classifier, WAN link health SLE metric engine 352 may use basic threshold based detection as described below. For example, WAN link health SLE metric engine 352 may look at the tx_bps, rx_bps, and mbps columns under the "interfaces" field of the "oc-stats-analytics" messages determined from the received path data 318. If link usage is greater than the oversubscription threshold determined as a certain percentage of the interface limit, e.g., 80% of the interface limit, WAN link health SLE metric engine 352 is configured to detect congestion. Example detection logic is as follows.

max(tx_bps, rx_bps)*1_000_000/mbps>congestion threshold(0.8)

In order to calculate the cable issues sub-classifier, WAN link health SLE metric engine 352 may also use a threshold based detection. For example, WAN link health SLE metric engine 352 may look at the rx_fcserrors column under the "interfaces" field of the "oc-stats-analytics" messages determined from the received path data 318. If the number of errors is greater than the error threshold determined as an acceptable number of errors, e.g., 0 or no errors, WAN link health SLE metric engine 352 is configured to detect cable issues.

The LTE signal sub-classifier is specific to an LTE interface if present in a network device. LTE signal strength and quality is measured using multiple measures which are spread across multiple bands. Table 2, below, describes the different measures used to determine the quality of the LTE signal.

TABLE 2

| Band | RSSI | RSRP (dBm) | SNR (dB) |
|---|---|---|---|
| Excellent | >−65 | >−84 | >12.5 |
| Good | −65 to −75 | −85 to −102 | 10 to 12.5 |
| Fair | −75 to −85 | −103 to −111 | 7 to 10 |
| Poor | <−85 | <−111 | <7 |

In order to calculate the LTE signal sub-classifier, WAN link health SLE metric engine 352 may also use a threshold based detection. For example, WAN link health SLE metric engine 352 may look at RSSI, RSRP, and SNR values under the "lte_stats" field of the "oc-stats-analytics" messages determined from the received path data 318. In some examples, if the RSSI, RSRP, and SNR values meet a weak signal or unstable signal threshold determined as all values falling under the poor band, e.g., as defined in Table 2 above, WAN link health SLE metric engine 352 is configured to detect an LTE signal issue. Example detection logic is as follows.

rssi<−85 and rsrp<−111 and snr<7

In other examples, different combinations of poor, fair, good, or excellent bands for each of the RSSI, RSRP, and SNR values may be used to detect an LTE signal issue.

As discussed above with respect to FIG. 3, WAN link health SLE metric engine 352 of NMS 300 is configured to monitor the WAN link health at the network (logical path) level and detect network-level issues. The logical paths (e.g., peer paths or tunnels) may originate from spoke routers to a hub router. In some examples, the network classifier is further sub-classified into four sub-classifiers: latency, jitter, loss, and logical path down. Latency, jitter, and loss sub-classifiers are performance based metrics, which measure the efficacy of the logical path (e.g., peer path or tunnel) used for transport of data from spoke routers to hub routers. In contrast, the logical path down sub-classifier detects whether the logical path is down. In examples where the spoke and hub routers are session-based routers, the logical path down sub-classifier may be referred to as "peer path down." In examples where the spoke and hub routers are packet-based routers, the logical path down sub-classifier may be referred to as "IPsec tunnel down."

In order to calculate the latency, jitter and loss sub-classifiers, WAN link health SLE metric engine 352 may use a baselining approach. The baselining approach may include calculating averages and standard deviations over a first period of time, e.g., 14 days, for each of the measurements across all the logical paths across all the sites, and calculating thresholds based on the averages and standard deviations that are then used to detect anomalies. Besides baselining, WAN link health SLE metric engine 352 may also apply some upper and lower thresholding for each of the measurements, which may be determined based on testing and heuristics. In addition to baselines and fixed upper and lowers thresholds, WAN link health SLE metric engine 352 may further apply moving averages to reduce spikiness and instead smooth out the detection (e.g., using a moving average of the previous 5 measurement recordings).

For example, WAN link health SLE metric engine 352 may look at each of the latency, jitter, and loss measurements under a logical path stats field of the "oc-stats-analytics" messages (e.g., under a "ssr_peer_path_stats" field) determined from the received path data 318. The measurements may be sampled at determined intervals, e.g., every 5 seconds, such that each sample for each logical path provides the latency, jitter and loss measurements used to detect network performance issues at the logical path level.

For the latency sub-classifier, if the latency measurement exceeds an upper latency threshold or exceeds a lower latency threshold and exceeds the latency baseline over the moving average, WAN link health SLE metric engine 352 is configured to detect latency issues. Example detection logic is as follows.

```
latency > upper_threshold(250ms) OR
(
    latency > lower_threshold(150ms) AND
    latency > (14_day_avg + 2 * 14_day_stddev) AND
    moving_avg_of_5 > (14_day_avg + 2 * 14_day_stddev)
)
```

For the jitter sub-classifier, if the jitter measurement exceeds an upper jitter threshold or exceeds a lower jitter threshold and exceeds the jitter baseline over the moving average, WAN link health SLE metric engine 352 is configured to detect jitter issues. Example detection logic is as follows.

```
jitter > upper_threshold(40ms) OR
(
    jitter > lower_threshold(5ms) AND
    jitter > (14_day_avg + 2 * 14_day_stddev) AND
    moving_avg_of_5 > (14_day_avg + 2 * 14_day_stddev)
)
```

For the loss sub-classifier, if the loss measurement exceeds an upper loss threshold or exceeds a lower loss threshold and exceeds the loss baseline over the moving average, WAN link health SLE metric engine 352 is configured to detect loss issues. Example detection logic is as follows.

```
loss > upper_threshold(8%) OR
(
    loss > lower_threshold(0%) AND
    loss > (14_day_avg + 2 * 14_day_stddev) AND
    moving_avg_of_5 > (14_day_avg + 2 * 14_day_stddev)
)
```

In order to calculate the logical path down sub-classifier, WAN link health SLE metric engine 352 may receive indications of logical path down events at the network devices. For example, NMS 300 receives an oc-event if any of a session-based router's active peer paths goes down. WAN link health SLE metric engine 352 may look for PEER_PATH_DOWN events under "oc-events" in the event-driven data of path data 318. WAN link health SLE metric engine 352 processes this event to detect the peer path down sub-classifier. NMS 300 and/or WAN link health SLE metric engine 352 may store the peer path's detected state in database 315, for example, and update the record when the status of the peer path changes. For example, when the peer path comes back up, NMS 300 receives another event with type PEER_PATH_UP under "oc-events" in the event-driven data of path data 318, and WAN link health SLE metric engine 352 uses the event to update the state of the peer path in database 315. WAN link health SLE metric engine 352 may perform a similar process to detect an IPsec tunnel down sub-classifier in the case of packet-based routers based on IPSEC_TUNNEL_DOWN or IPSEC_TUNNEL_UP events under the "oc-events" in the event-driven data of path data 318.

The logical path down sub-classifier takes higher precedence over the other network level sub-classifiers, e.g., latency, jitter, and loss. In this way, if a logical path is detected as down, WAN link health SLE metric engine 352 does not perform any performance-based detection of, e.g., latency, jitter, or loss for the logical path. If a logical path's status stays down, WAN link health SLE metric engine 352 continues to detect the logical path down sub-classifier for as long as the logical path remains in the down state. In some examples, WAN link health SLE metric engine 352 may have an upper limit on how long to detect and report the logical path down sub-classifier. As one example, the upper limit may be 7 days from the time the logical path was first reported as down. If a logical path remains down after the upper limit, WAN link health SLE metric engine 352 may stop reporting the logical path down sub-classifier.

The "oc-events" are irregular (in contrast to the "oc-stats" and "oc-stats-analytics" received on a periodic interval mins) since they are only reported when an event occurs at the network device end. Example pseudo-code of one such PEER_PATH_DOWN "oc-event" follows.

'EvType': 'OC_PEER_PATH_DOWN'

If a PEER_PATH_DOWN event is detected, WAN link health SLE metric engine 352 is configured to detect a peer path down issue, and maintain the state of the peer path until receipt of a PEER_PATH_UP event for the same peer path, in which case WAN link health SLE metric engine 352 stops detecting the peer path down issue.

As discussed above with respect to FIG. 3, WAN link health SLE metric engine 352 of NMS 300 is configured to monitor the WAN link health at the link level and detect link-level unreachability issues. For example, spoke router links may fail to reach the next-hop ISP gateway due to different reasons including ARP, DHCP and BGP. In some examples, the ISP reachability classifier is further sub-classified into two sub-classifiers: DHCP and ARP.

In order to calculate the ARP sub-classifier, WAN link health SLE metric engine 352 may receive indications of ARP events at the network devices. For example, WAN link health SLE metric engine 352 may look for ARP_UNRESOLVED events under "oc-events" in the event-driven data of path data 318. The "oc-events" are irregular (in contrast to the "oc-stats" and "oc-stats-analytics" received on a periodic interval mins) since they are only reported when an event occurs at the network device end. Example pseudo-code of one such "oc-event" follows.

'EvType': 'OC_ARP_UNRESOLVED'

If an ARP_UNRESOLVED event is detected, WAN link health SLE metric engine 352 is configured to detect an ARP issue.

In order to calculate the DHCP sub-classifier, WAN link health SLE metric engine 352 may receive indications of DHCP events at the network devices. For example, WAN link health SLE metric engine 352 may look for DHCP_UNRESOLVED events under "oc-events" in the event-driven data of path data 318. Example pseudo-code of one such "oc-event" follows.

'EvType': 'OC_DHCP_UNRESOLVED'

If a DHCP_UNRESOLVED event is detected, WAN link health SLE metric engine 352 is configured to detect a DHCP issue.

Since the "oc-events" are not regular events, WAN link health SLE metric engine 352 maintains the previous state (resolved or unresolved) until NMS 300 receives a new "oc-events." To keep the previous state, WAN link health SLE metric engine 352 may use the "oc-stats-analytics" intervals. The "oc-stats-analytics" interval may also help to ensure that if a link goes down, WAN link health SLE metric engine 352 does not rely on a previously reported link-level unreachability classifier. For example, when a link goes down, the "oc-stats-analytics" are not reported for that link, hence WAN link health SLE metric engine 352 stops reporting any unreachability issues on that link.

The ARP and DHCP sub-classifiers of the ISP reachability classifier as described in more detail. For the ARP sub-classifier, when an upstream gateway is not ARP'able, this results in the ARP entry being "expired" on the downstream network device, e.g., spoke router 187A of FIGS. 1B-1C. The path data agent, e.g., path data agent 238 of FIG. 2, of the downstream network device generates events for any transition from Valid-to-Expired and Expired-to-Valid for the ARP entry in order to report the current health of the WAN link to NMS 130. Whenever the path data agent of the downstream network device first connects to NMS 130 in the cloud, the path data agent sends a generic event message with the "current" status as it may be hard for NMS 130 to predict the last known status of the event with respect to the cloud. The ARP event may include the following:

device-interface name
network-interface name
remote ip-address
previous state—could be unknown/invalid for the startup case
current state For the DHCP sub-classifier, when the WAN interface of the downstream network device is doing DHCP with the upstream gateway/modem the various events related to the DHCP lease acquisition, renewal, etc. will be reported to NMS 130 in the cloud. The DHCP event will include the following:

device-interface name
network-interface name
status—renewed, changed, failed, etc.
ip-address During troubleshooting, the WAN link health SLE metric engine may analyze the path data on the WAN interface specifically to get an idea of the following:

1. Whether the link is connected—operational status
2. Can the link reach the next hop ISP gateway
   a. ARP reachability status
   b. BGP connection status
   c. Potentially even a ping status to the next-hop gateway (e.g., as a command line execution from the downstream network device)
3. Can the next hop ISP gateway reach the downstream network device?
   a. ARP-related issues have been observed in cable provider networks, where the ISP's CPE device will send ARP requests for the downstream network device's WAN IP from the "wrong" subnet (e.g., "who has 5.5.5.5? tell 4.4.4.4"). By default and by design, the downstream network device does not respond to these bad ARPs, which can lead to a case where the downstream network device may transmit packets to the far end but not receive any return traffic. Net result: logical paths never transition to "up."
4. When the interface has DHCP—is the address stable?
   a. DHCP circuits may have with static IPs assigned to them by the ISP
   b. The ISP modem may not assign the expected IP, e.g., downstream network device is supposed to get a public IP but is assigned a private one instead
   c. May run scripts to detect this condition and take actions like restarting the interface, etc.
5. When the link has peer paths
   a. Are all the paths to the remote routers up—peer path up/down status
   b. Is the peer path link stable—looking for signs of peer path flaps or any instability
   c. Are we experiencing any loss on the peer path link? Typically high or any amounts of loss are not expected and should be flagged
   d. Are we experiencing higher than normal latency
      i. This is mainly used to detect any large deviation from what "normal" is supposed to be.
      ii. This may be a rare occurrence, but it is something that is looked for
6. Are there any interfering "middleboxes"?
   a. The Secure Vector Routing (SVR) protocol used by session-based routers includes an exchange of information ("metadata") between two instances of software at the outset of every session. For TCP transactions, this is done by augmenting a TCP SYN with payload. Some security appliances may discard this traffic as potentially malicious (e.g., TCP SYN with payload is legal per specification, but admittedly uncommon). To address this, the session-based routers may include a "firewall detector" probe that runs periodically to detect whether any middleboxes exist on a peer path, and adapt its behavior if it finds them.
7. Signs of instability at the driver level:
   a. Is the link congested?
      i. When traffic engineering (TE) is enabled, congestion would result in drop statistics on that interface being incremented.
      ii. For example, if TE is configured for the interface to allow for 90 Mbps, when that threshold is exceeded the network device would route around that interface
      iii. When TE is disabled, congestion would also result in drops by the driver as the link speeds might be exceeded.
      iv. For example, trying to push lots of data on a 10/100 link
   b. TX/RX lockups that force a highway restart
8. Speed tests and other measurements
   a. Speed tests may be run on the WAN link to establish if the circuit speeds match what the site is subscribed for
9. Run additional diagnostics based on the transport type
   a. For T1 links, look for signs of overrun errors, etc.
   b. For LTE links, look for various signal strength and SNR to detect signs of stability The WAN link health SLE metric engine may analyze the path data on the WAN interface during proof-of-concept when a typical SD-WAN conversion is not using session-based routers as the customer is typically looking to leverage new and cheaper circuits. The NMS and the WAN link health SLE metric engine may help customers troubleshoot their WAN networks; sometimes even before a ton of traffic is flowing through the routers. In addition, the WAN link health SLE metric engine may analyze the path data on the WAN interface post deployment. The NMS and the WAN link health SLE metric engine may help customers troubleshoot the WAN circuits for stability problems, e.g., this may be reported as a bad user or application experience, but is more of a general complaint rather than a specific application.

FIGS. 5A-5D illustrate example WAN link health user interfaces of the NMS for display on a user interface device, in accordance with the techniques of this disclosure. The example user interfaces illustrated in FIGS. 5A-5D present a "WAN Link Health" service level metric including classifiers and sub-classifiers that are calculated on peer paths between session-based routers over a WAN.

Figure 5A:
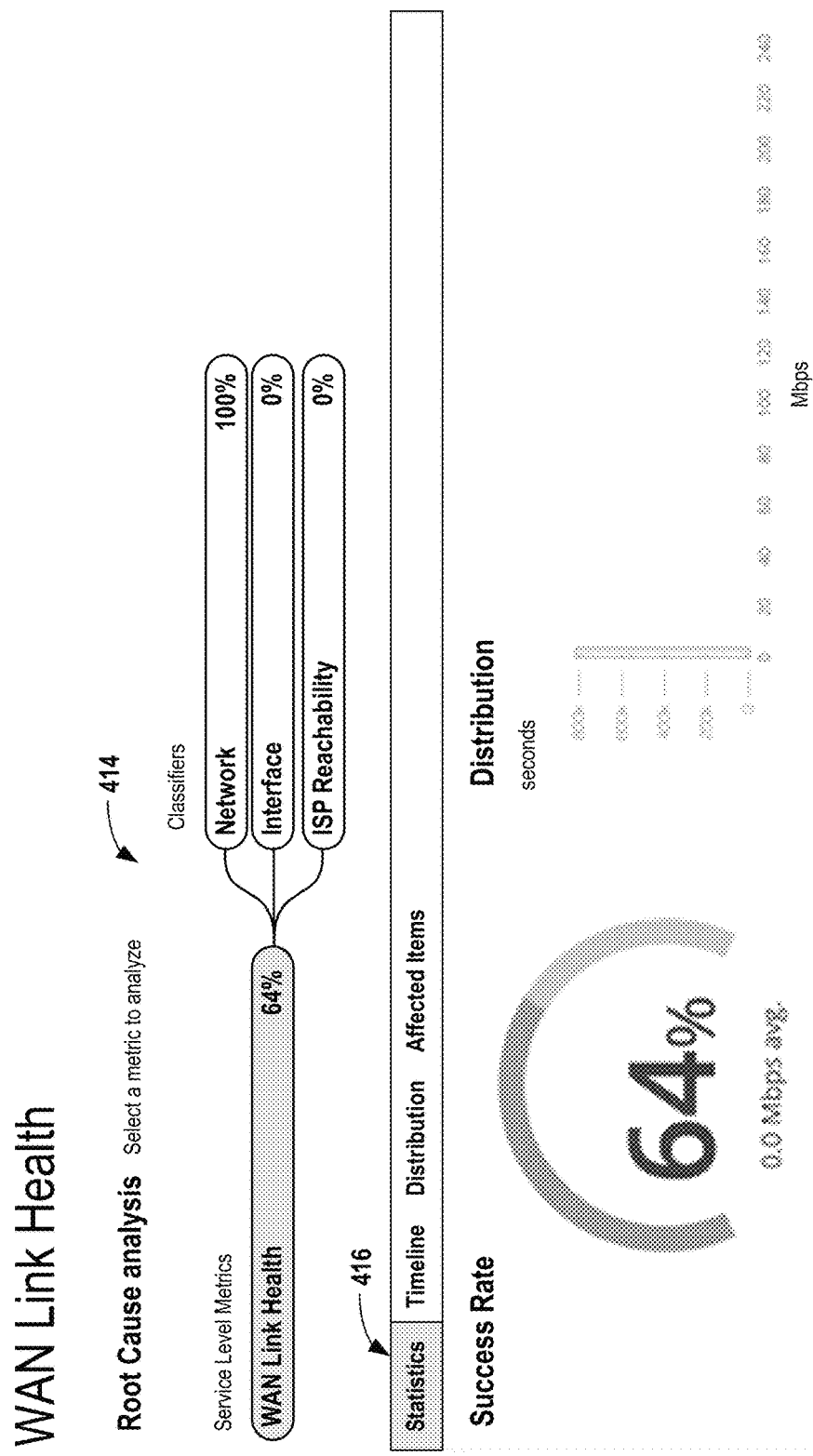
FIGS. 5A-5D illustrate example WAN link health user interfaces of the NMS for display on a user interface device, in accordance with the techniques of this disclosure.

FIG. 5A illustrates an example WAN link health user interface 410 of the NMS for display on a user interface device, in accordance with the techniques of this disclosure. In the illustrated example, user interface 410 includes a root cause analysis portion 414 and a statistics portion 416. Root cause analysis portion 414 includes a "WAN Link Health" service level metric that, when selected, expands to present classifiers of the SLE, including a logical path ("Network") classifier, a physical interface ("Interface") classifier, and a service provider reachability ("ISP Reachability") classifier. Statistics portion 416 includes a success rate graph that provides an overall success rate across all classifiers of the WAN link health metric.

In the illustrated example of FIG. 5A, root cause analysis portion 414 and statistics portion 416 indicate that the WAN link health metric is 64% successful for a selected site and time period. Root cause analysis portion 414 further indicates that the logical path ("Network") classifier is 100% associated with the root cause of the WAN link health issues.

Figure 5B:
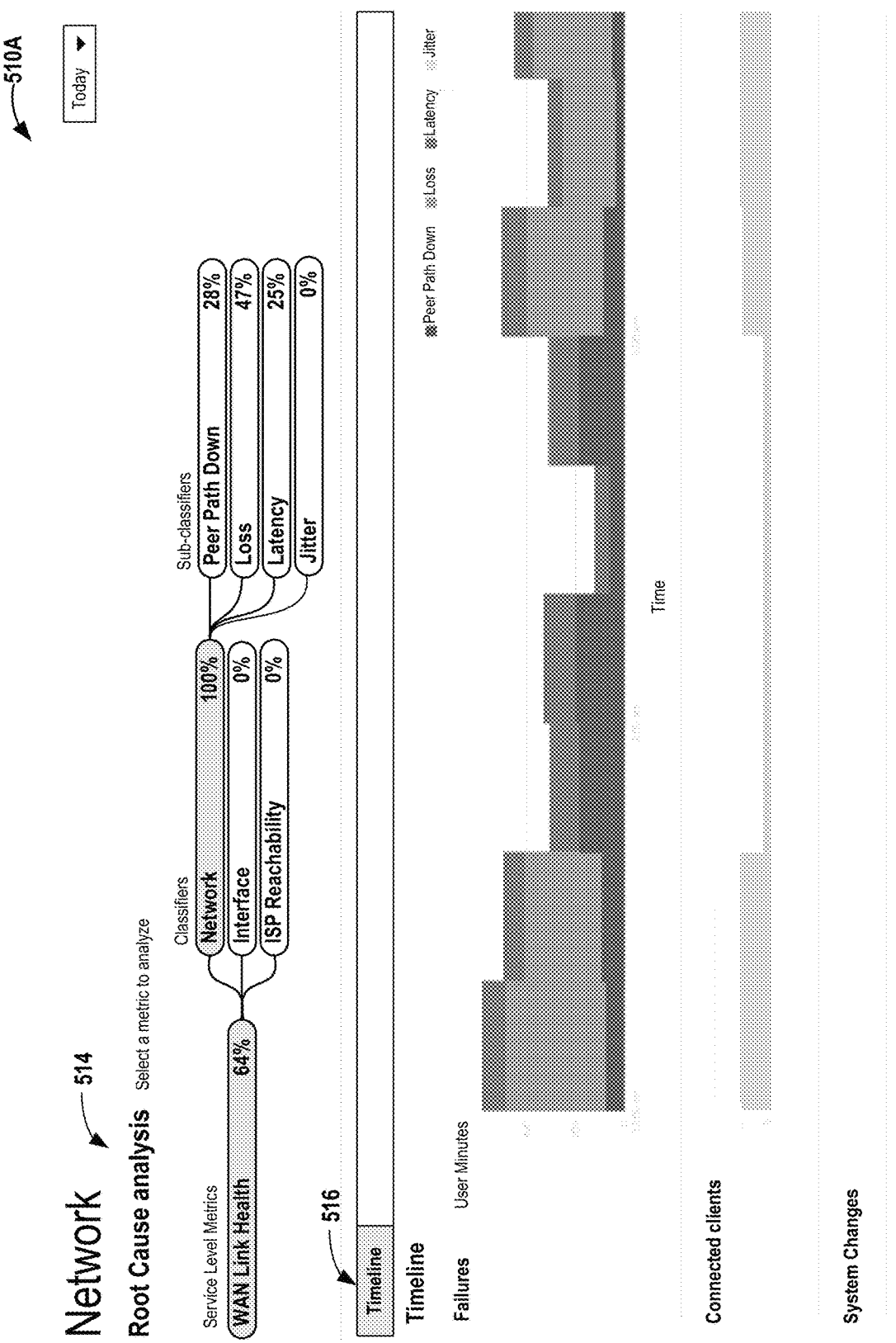

FIG. 5B illustrates an example user interface 510A to provide user visibility into WAN link health with respect to the network-level or logical path-level performance. In the illustrated example, user interface 510A includes a root cause analysis portion 514 and a timeline portion 516. Root cause analysis portion 514 includes a "WAN Link Health" service level metric that, when selected, expands to present classifiers of the SLE, including a logical path ("Network") classifier, a physical interface ("Interface") classifier, and a service provider reachability ("ISP Reachability") classifier. When the logical path ("Network") classifier is selected, it expands to present sub-classifiers of the SLE, including peer path down, jitter, loss, and latency sub-classifiers. Timeline portion 516 includes a timeline of failed user-path-minutes associated with the selected classifier and its sub-classifiers over time. Timeline portion 516 may also identify a number of connected clients and any system changes over time.

In the illustrated example of FIG. 5B, root cause analysis portion 514 indicates that the logical path ("Network") classifier is 100% associated with the root cause of the WAN link health issues for a selected site and time period (i.e., Today). Furthermore, root cause analysis portion 514 indicates that peer path down is 28% of the root cause of the WAN link health issues, loss is 47% of the root cause of the WAN link health issues, latency is 25% of the root cause of the WAN link health issues, and jitter is 0% of the root cause of the WAN link health issues. Timeline portion 516 graphs the quantity of failed user-path-minutes for each of the peer path down, loss, latency, and jitter sub-classifiers over time (i.e., Today).

Figure 5C:
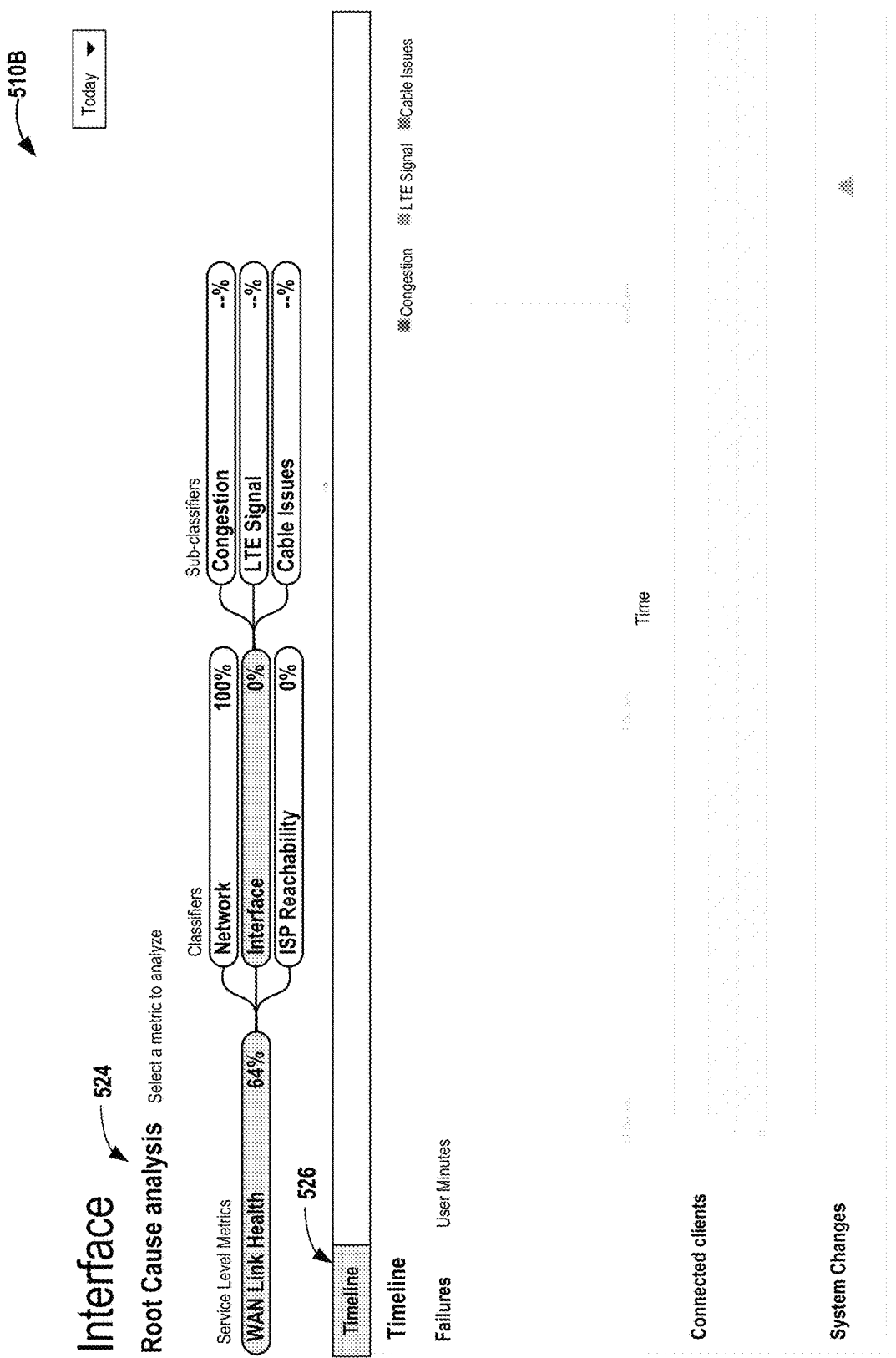

FIG. 5C illustrates an example user interface 510B to provide user visibility into WAN link health with respect to the physical interface-level operation. In the illustrated example, user interface 510B includes a root cause analysis portion 524 and a timeline portion 526. Root cause analysis portion 524 includes a "WAN Link Health" service level metric that, when selected, expands to present classifiers of the SLE, including a logical path ("Network") classifier, a physical interface ("Interface") classifier, and a service provider reachability ("ISP Reachability") classifier. When the physical interface ("Interface") classifier is selected, it expands to present sub-classifiers of the SLE, including congestion, LTE signal, and cable issues, and in some cases VPN, sub-classifiers. Timeline portion 526 includes a timeline of failed user-path-minutes associated with the selected classifier and its sub-classifiers over time. Timeline portion 526 may also identify a number of connected clients and any system changes over time.

In the illustrated example of FIG. 5C, root cause analysis portion 524 indicates that the logical path ("Network") classifier is 100% associated with the root cause of the WAN link health issues for a selected site and time period (i.e., Today). As such, no failure states associated with physical interface operation have been determined, and a timeline of the failed user-path-minutes associated with the physical interface classifier and/or its sub-classifiers is empty in timeline portion 526.

Figure 5D:
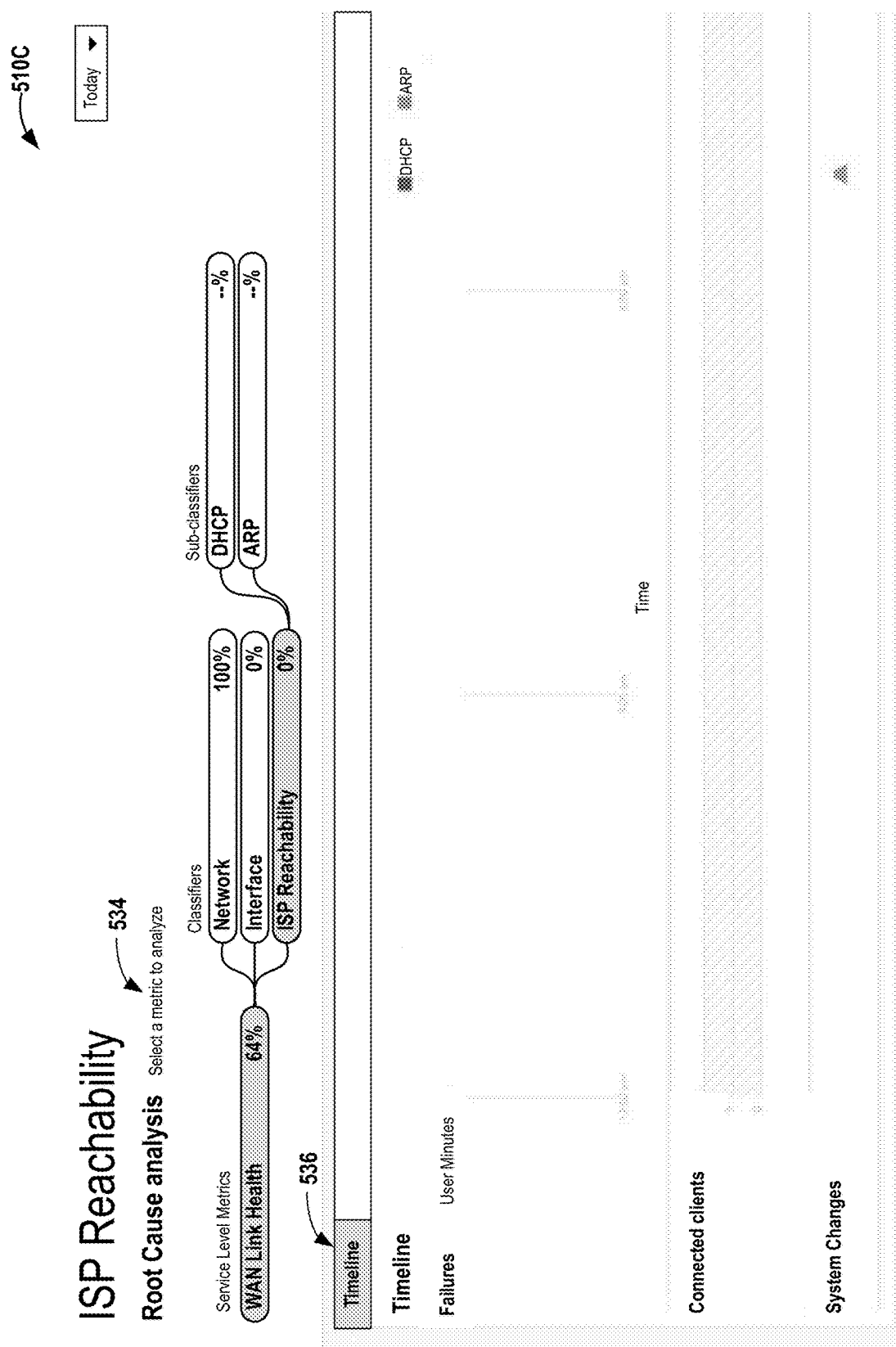

FIG. 5D illustrates an example user interface 510C to provide user visibility into WAN link health with respect to service provider reachability. In the illustrated example, user interface 510C includes a root cause analysis portion 534 and a timeline portion 536. Root cause analysis portion 534 includes a "WAN Link Health" service level metric that, when selected, expands to present classifiers of the SLE, including a logical path ("Network") classifier, a physical interface ("Interface") classifier, and a service provider reachability ("ISP Reachability") classifier. When the service provider reachability ("ISP Reachability") classifier is selected, it expands to present sub-classifiers of the SLE, including DHCP and ARP, and in some cases BGP, sub-classifiers. Timeline portion 536 includes a timeline of failed user-path-minutes associated with the selected classifier and its sub-classifiers over time. Timeline portion 536 may also identify a number of connected clients and any system changes over time.

In the illustrated example of FIG. 5D, root cause analysis portion 534 indicates that the logical path ("Network") classifier is 100% associated with the root cause of the WAN link health issues for a selected site and time period (i.e., Today). As such, no failure states associated with service provider reachability have been determined, and a timeline of the failed user-path-minutes associated with the service provider reachability classifier and/or its sub-classifiers is empty in timeline portion 536.

Figure 6A:
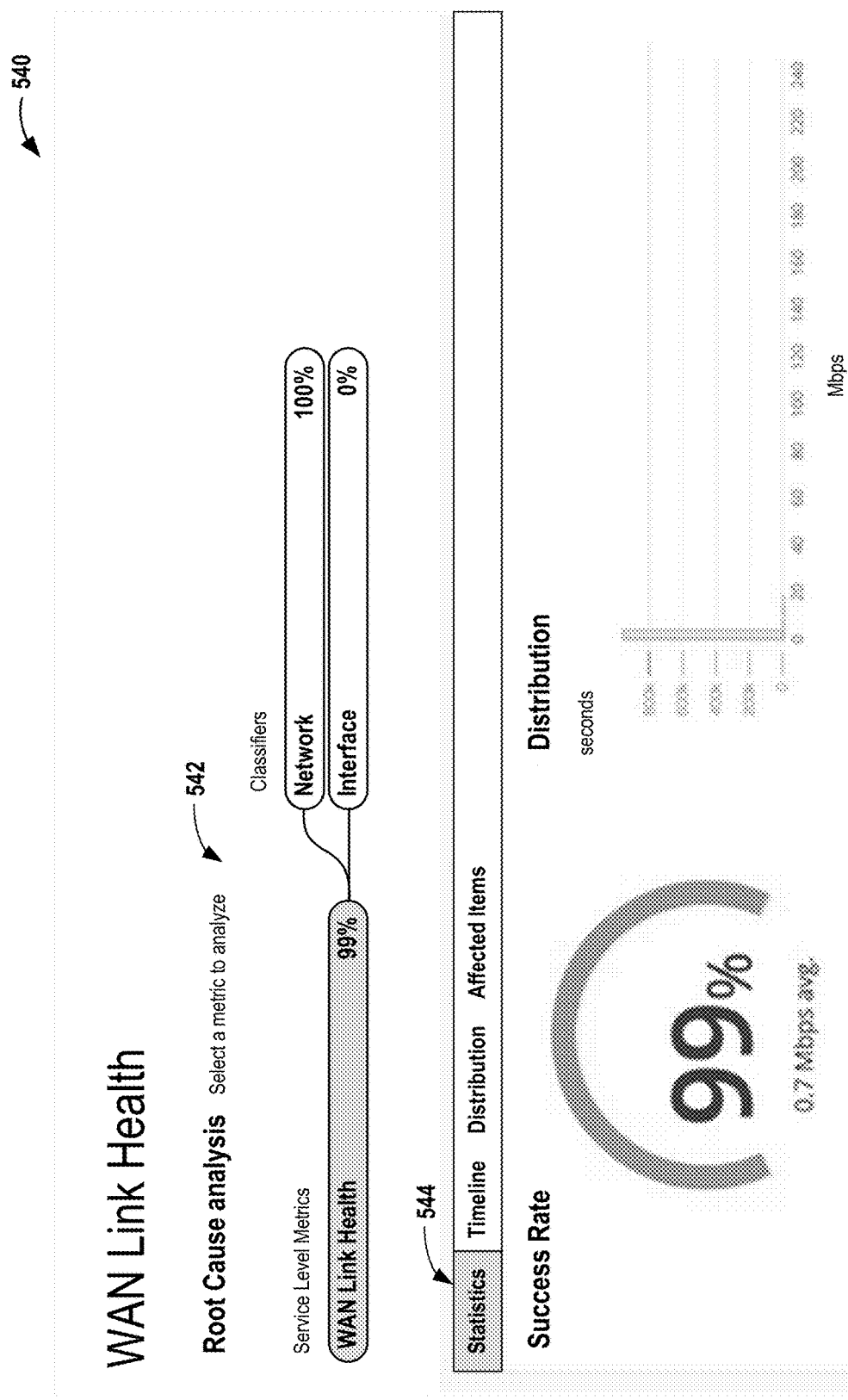
FIGS. 6A-6B illustrate other example WAN link health user interfaces of the NMS for display on a user interface device, in accordance with the techniques of this disclosure.
Figure 6B:
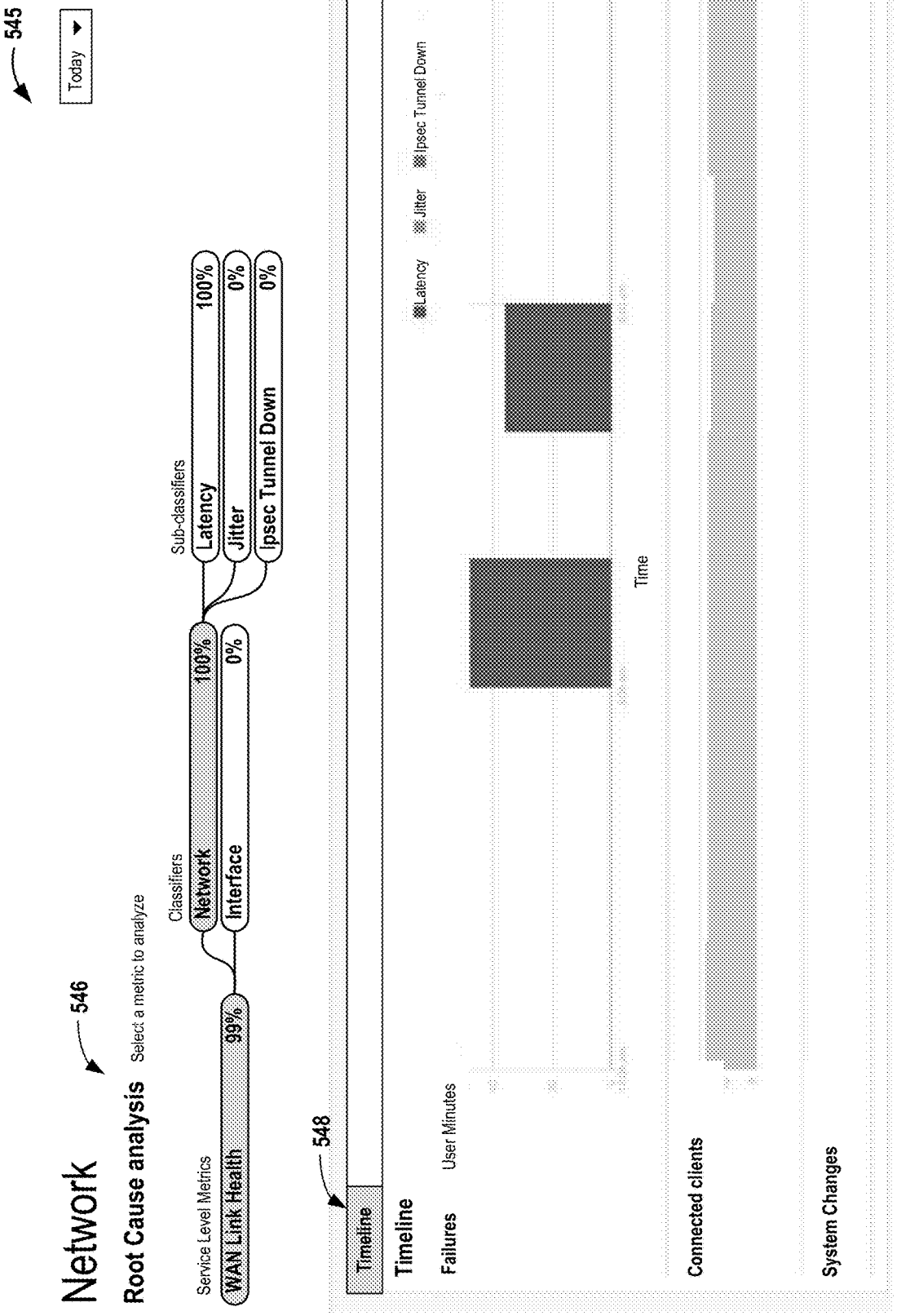

FIGS. 6A-6B illustrate other example WAN link health user interfaces of the NMS for display on a user interface device, in accordance with the techniques of this disclosure. The example user interfaces illustrated in FIGS. 6A-6B present a "WAN Link Health" service level metric including classifiers and sub-classifiers that are calculated on IPsec tunnels between packet-based routers over a WAN.

FIG. 6A illustrates an example WAN link health user interface 540 of the NMS for display on a user interface device, in accordance with the techniques of this disclosure. In the illustrated example, user interface 540 includes a root cause analysis portion 542 and a statistics portion 544. Root cause analysis portion 542 includes a "WAN Link Health" service level metric that, when selected, expands to present classifiers of the SLE, including a logical path ("Network") classifier and a physical interface ("Interface") classifier.

Statistics portion 544 includes a success rate graph that provides an overall success rate across all classifiers of the WAN link health metric.

In the illustrated example of FIG. 6A, root cause analysis portion 542 and statistics portion 544 indicate that the WAN link health metric is 99% successful for a selected site and time period. Root cause analysis portion 542 further indicates that the logical path ("Network") classifier is 100% associated with the root cause of the WAN link health issues.

FIG. 6B illustrates an example user interface 545 to provide user visibility into WAN link health with respect to the network-level or logical path-level performance. In the illustrated example, user interface 545 includes a root cause analysis portion 546 and a timeline portion 548. Root cause analysis portion 546 includes a "WAN Link Health" service level metric that, when selected, expands to present classifiers of the SLE, including a logical path ("Network") classifier and a physical interface ("Interface") classifier. When the logical path ("Network") classifier is selected, it expands to present sub-classifiers of the SLE, including latency, jitter, and IPsec tunnel down sub-classifiers. Timeline portion 548 includes a timeline of failed user-path-minutes associated with the selected classifier and its sub-classifiers over time. Timeline portion 548 may also identify a number of connected clients and any system changes over time.

In the illustrated example of FIG. 6B, root cause analysis portion 546 indicates that the logical path ("Network") classifier is 100% associated with the root cause of the WAN link health issues for a selected site and time period (i.e., Today). Furthermore, root cause analysis portion 546 indicates that latency is 100% of the root cause of the WAN link health issues, jitter is 0% of the root cause of the WAN link health issues, and IPsec tunnel down is 0% of the root cause of the WAN link health issues. Timeline portion 548 graphs the quantity of failed user-path-minutes for each of the latency, jitter, and IPsec tunnel down sub-classifiers over time (i.e., Today).

FIGS. 7A-7D illustrate additional example WAN link health user interfaces of the NMS for display on a user interface device, e.g., operated by a network administrator of an enterprise network, in accordance with the techniques of this disclosure. The example user interfaces illustrated in FIGS. 7A-7D present a "WAN Link Health" service level metric including classifiers and sub-classifiers that are calculated on peer paths between session-based routers over a WAN. The example user interfaces of FIGS. 7A-7C indicate the classifiers and sub-classifiers associated with the root cause of the WAN link health issues for a same selected site but a different time period (i.e., Last 7 Days) compared to the example user interfaces of FIGS. 5B-5D.

Figure 7A:
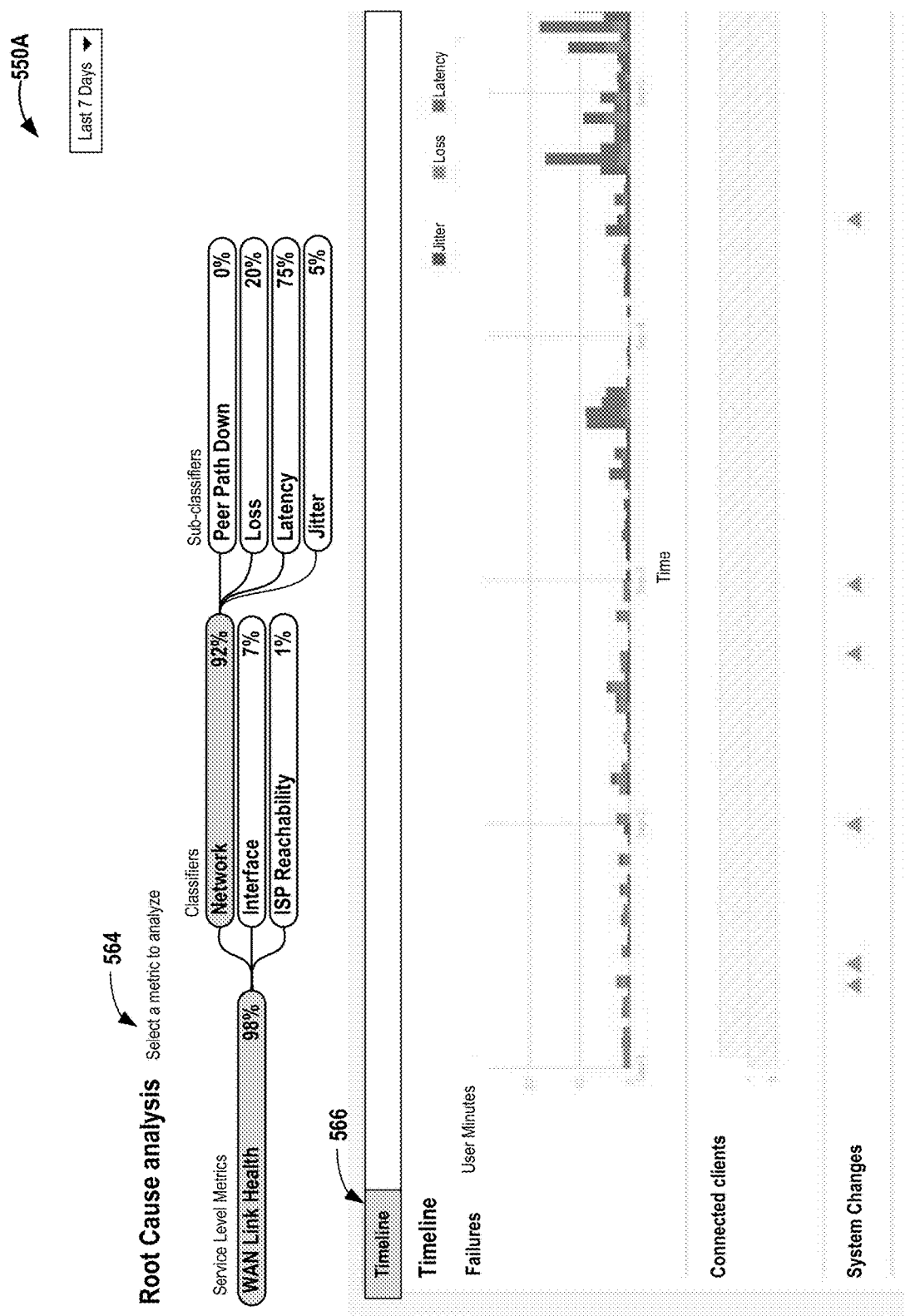
FIGS. 7A-7D illustrate additional example WAN link health user interfaces of the NMS for display on a user interface device, in accordance with the techniques of this disclosure.

FIG. 7A illustrates an example user interface 550A to provide user visibility into WAN link health with respect to the network-level or logical path-level performance. User interface 550A is substantially similar to user interface 510A of FIG. 5B, but visualizes a longer period of time (i.e., the Last 7 Days as opposed to Today). In the illustrated example of FIG. 7A, root cause analysis portion 564 indicates that the logical path ("Network") classifier is 92% associated with the root cause of the WAN link health issues for the selected site and time period (i.e., Last 7 Days). Furthermore, root cause analysis portion 564 indicates that peer path down is 0% of the root cause of the Network classified WAN link health issues, jitter is 5% of the root cause of the Network classified WAN link health issues, loss is 20% of the root cause of the Network classified WAN link health issues, and latency is 75% of the root cause of the Network classified WAN link health issues. Timeline portion 566 graphs the quantity of failed user-path-minutes for each of the jitter, loss, and latency sub-classifiers over time (i.e., Last 7 Days).

Figure 7B:
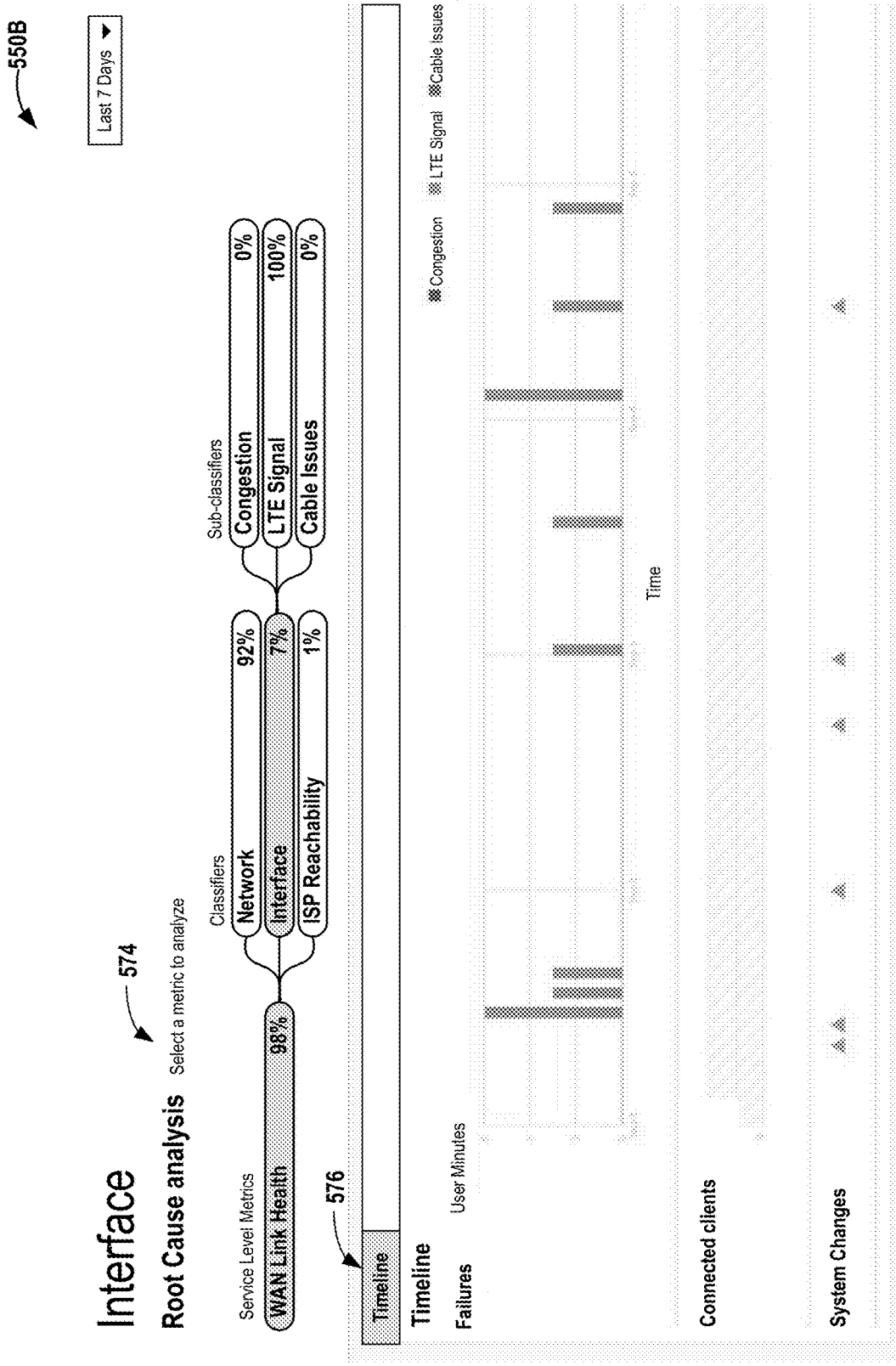

FIG. 7B illustrates an example user interface 550B to provide user visibility into WAN link health with respect to the physical interface-level operation. User interface 550B is substantially similar to user interface 510B of FIG. 5C, but visualizes a longer period of time (i.e., the Last 7 Days as opposed to Today). In the illustrated example of FIG. 7B, root cause analysis portion 574 indicates that the physical interface ("Interface") classifier is 7% associated with the root cause of the WAN link health issues for the selected site and time period (i.e., Last 7 Days). Furthermore, root cause analysis portion 574 indicates that LTE signal strength is 100% of the root cause of the Interface classified WAN link health issues. Timeline portion 576 graphs the quantity of failed user-path-minutes for each of the congestion, LTE signal, and cable issues sub-classifiers over time (i.e., Last 7 Days).

Figure 7C:
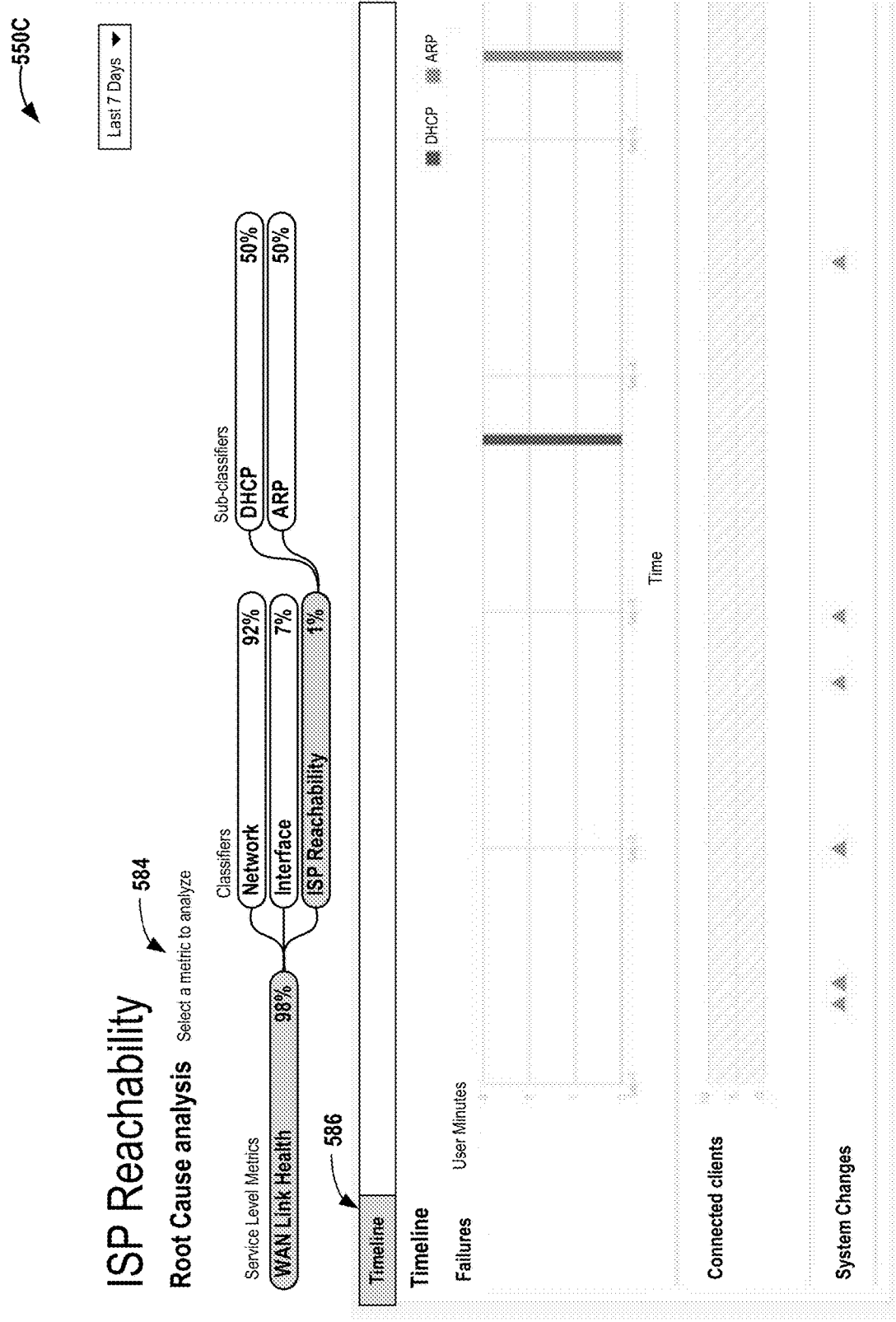

FIG. 7C illustrates an example user interface 550C to provide user visibility into WAN link health with respect to service provider reachability. User interface 550C is substantially similar to user interface 510C of FIG. 5D, but visualizes a longer period of time (i.e., the Last 7 Days as opposed to Today). In the illustrated example of FIG. 7C, root cause analysis portion 584 indicates that the service provider reachability ("ISP Reachability") classifier is 1% associated with the root cause of the WAN link health issues for the selected site and time period (i.e., Last 7 Days). Furthermore, root cause analysis portion 584 indicates that DHCP is 50% of the root cause of the ISP Reachability classified WAN link health issues, and that ARP is 50% of the root cause of the ISP Reachability classified WAN link health issues. Timeline portion 586 graphs the quantity of failed user-path-minutes for each of the DHCP and ARP sub-classifiers over time (i.e., Last 7 Days).

Figure 7D:
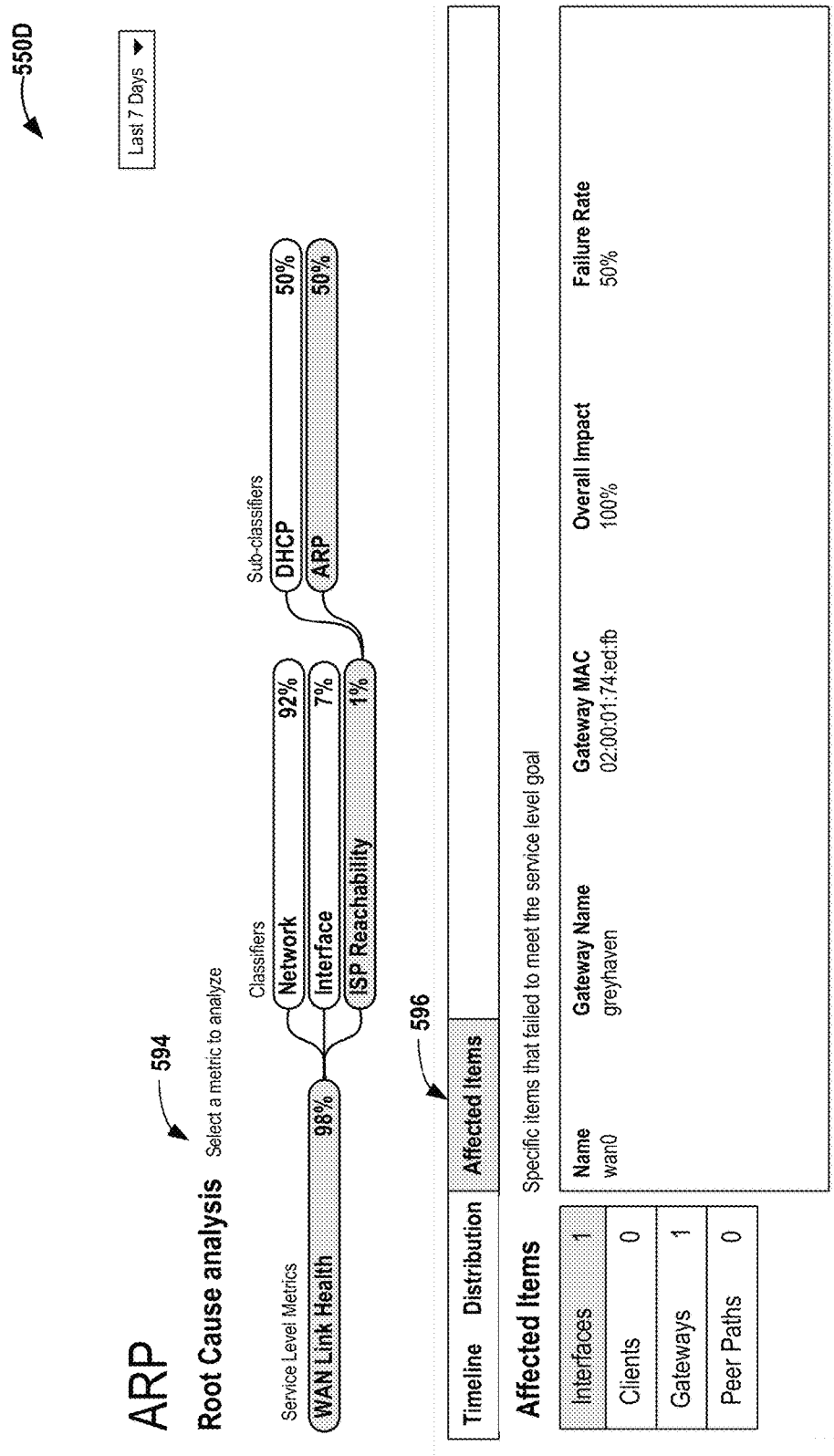

FIG. 7D illustrates an example user interface 550D to provide user visibility into WAN link health with respect to ARP events. In the illustrated example, user interface 550D includes a root cause analysis portion 594 and an affected items portion 596. Root cause analysis portion 594 is an extension of the root cause analysis portion 584 of user interface 550C of FIG. 7C, and is presented when the ARP sub-classifier of the service provider reachability ("ISP Reachability") classifier is selected. Affected items portion 596 includes a list of categories of potential affected items including, e.g., interfaces, clients, gateways, and peer paths. When any of the categories is selected, affected items portion 596 presents details regarding each affected item within that category, including identification, overall impact, and failure rate of the affected item. In the illustrated example of FIG. 7D, affected items portion 596 includes a selected category of "Interfaces" and presents the details of an interface of a gateway that has a 50% failure rate due to ARP failure events.

Figure 8:
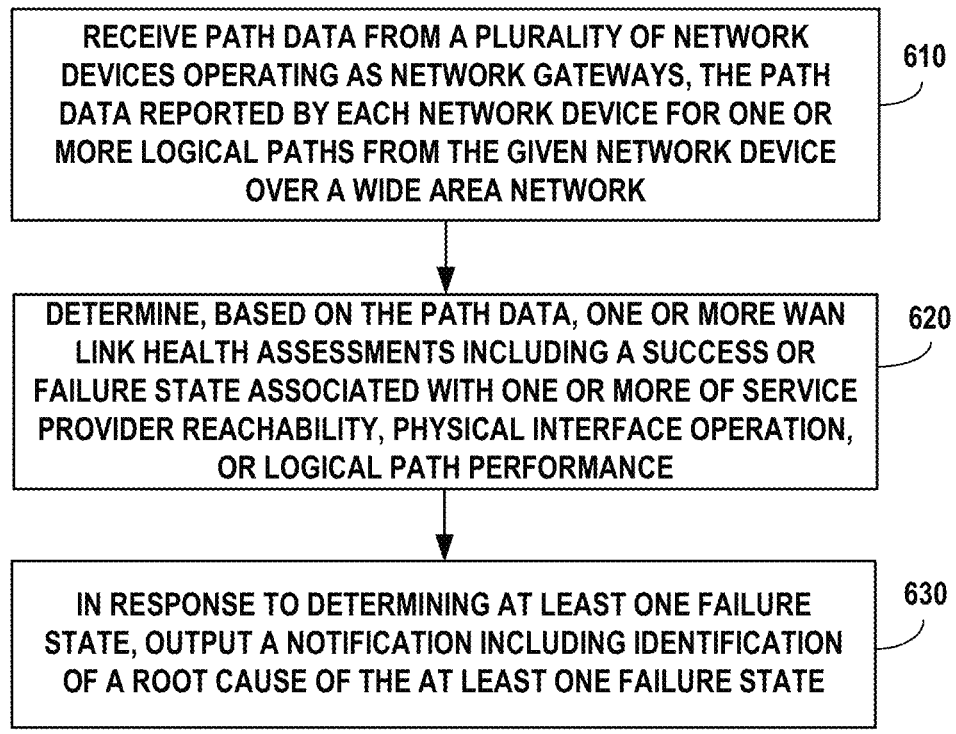
FIG. 8 is a flow chart illustrating an example operation by which the network management system monitors network performance and manages network faults in an enterprise network based on one or more WAN link health assessments, in accordance with the techniques of this disclosure.

FIG. 8 is a flow chart illustrating an example operation by which the network management system monitors network performance and manages network faults in an enterprise network based on one or more WAN link health assessments, in accordance with the techniques of this disclosure. The example operation of FIG. 8 is described herein with respect to NMS 300 and VNA/AI engine 350, including WAN link health SLE metric engine 352 and root cause analysis 354, of FIG. 3. In other examples, the operation of FIG. 8 may be performed by other computing systems or devices configured to monitor and assess client-side behavior data, such as NMS 130 and VNA 133 from FIGS. 1A-1C.

NMS 300 receives path data 318 from a plurality of network devices operating as network gateways, the path data 318 reported by each network device of the plurality of network devices for one or more logical paths of a physical interface from the given network device over a WAN (610). As described in this disclosure, the path data includes both periodically-reported data and event-driven data. NMS 300 periodically receive a package of statistical data from each network device including a header identifying the respective network device and a payload including multiple statistics and data samples collected for each of the logical paths during a previous periodical interval. NMS 300 also receives event data from at least one of the network devices in response to an occurrence of a certain event at the at least one of the network devices.

WAN link health SLE metric engine 352 of NMS 300 then determines, based on path data 318, one or more WAN link health assessments, wherein the one or more WAN link health assessments include a success or failure state associated with one or more of service provider reachability, physical interface operation, or logical path performance (620).

In one example, WAN link health SLE metric engine 352 determines a failure state associated with service provider reachability based on one or more ARP failure events or one or more DHCP failure events included in the path data received from the plurality of network devices. In response to determining the failure state associated with service provider reachability over a period of time, root cause analysis module 354 identifies the service provider as the root cause of the failure state associated with service provider reachability.

In another example, WAN link health SLE metric engine 352 determines a failure state associated with logical path performance based on one or more logical path down events included in the path data received from the plurality of network devices. In response to determining the failure state associated with logical path performance based on the logical path down events over a period of time, root cause analysis module 354 identifies the logical path as the root cause of the failure state associated with logical path performance.

In an additional example, WAN link health SLE metric engine 352 determines an operation metric for a physical interface of the given network device based on aggregated path data for the one or more logical paths of the physical interface received from the network device over a period of time, where the operation metric comprises one of bandwidth, error packets, or signal strength, and determines a failure state associated with physical interface operation based on the operation metric meeting a threshold. In response to determining the failure state associated with physical interface operation, root cause analysis module 354 identifies one of congestion, cable issues, or signal strength as the root cause of the failure state associated with physical interface operation.

In another example, WAN link health SLE metric engine 352 determines a baseline for a performance metric for a logical path of the given network device based on path data for the logical path received from the network device over a first period of time, where the performance metric comprises one of jitter, latency, or loss, and determines a failure state associated with logical path performance based on the performance metric degrading from the baseline for the performance metric over a second period of time. In response to determining the failure state associated with logical path performance, root cause analysis module 354 identifies the one of jitter, latency, or loss as the root cause of the failure state associated with logical path performance.

NMS 300, in response to determining at least one failure state, outputs a notification including identification of the root cause of the at least one failure state (630). The notification may include a recommendation to perform one or more remedial actions to address the root cause of the at least one failure state identified in the notification. In some examples, VNA/AI engine 350 of NMS 300 may invoke one or more remedial actions to address the root cause of the at least one failure state identified in the notification.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:
1. A network management system comprising:
memory; and
one or more processors coupled to the memory and configured to:
obtain path data of a plurality of network devices operating as network gateways, wherein the path data of a first network device of the plurality of network devices is associated with one or more logical paths of a physical interface of the first network device established with one or more other network devices of the plurality of network devices over a wide area network (WAN);

determine, based on the path data, one or more WAN link health assessments, wherein to determine the one or more WAN link health assessments, the one or more processors are configured to:

determine an amount of bandwidth requested by a user of the first network device as an operation metric for the physical interface of the first network device based on the path data of the first network device, and determine a failure state associated with physical interface operation based on the amount of bandwidth requested by the user satisfying an oversubscription threshold associated with a subscription level of the user; and output a notification indicating congestion as a root cause of the failure state associated with physical interface operation.

2. The network management system of claim 1, wherein to determine the one or more WAN link health assessments, the one or more processors are further configured to determine a failure state associated with service provider reachability based on one or more address resolution protocol (ARP) failure events included in the path data of the plurality of network devices; and wherein the one or more processors are configured to output a notification indicating the service provider as a root cause of the failure state associated with service provider reachability.

3. The network management system of claim 1, wherein to determine the one or more WAN link health assessments, the one or more processors are further configured to determine a failure state associated with service provider reachability based on one or more dynamic host configuration protocol (DHCP) failure events included in the path data of the plurality of network devices; and wherein the one or more processors are configured to output a notification indicating the service provider as a root cause of the failure state associated with service provider reachability.

4. The network management system of claim 1, wherein to determine the one or more WAN link health assessments, the one or more processors are further configured to determine a failure state associated with logical path performance based on one or more logical path down events included in the path data of the plurality of network devices; and wherein the one or more processors are configured to output a notification indicating the logical path as a root cause of the failure state associated with logical path performance.

5. The network management system of claim 1, wherein the failure state comprises a first failure state associated with physical interface operation, and wherein to determine the one or more WAN link health assessments, the one or more processors are further configured to:

determine a number of error packets on the physical interface of the first network device to which a cable is connected as an operation metric for the physical interface based on the path data of the first network device;

determine a second failure state associated with physical interface operation based on the number of error packets on the physical interface satisfying an error threshold; and wherein the one or more processors are configured to output a notification indicating cable issues as a root cause of the second failure state associated with physical interface operation.

6. The network management system of claim 1, wherein the failure state comprises a first failure state associated with physical interface operation, and wherein to determine the one or more WAN link health assessments, the one or more processors are further configured to:

determine a signal strength for the physical interface of the first network device as an operation metric for the physical interface based on the path data of the first network device;

determine a second failure state associated with physical interface operation based on the signal strength for the physical interface satisfying a weak signal threshold; and wherein the one or more processors are configured to output a notification indicating signal strength as a root cause of the second failure state associated with physical interface operation.

7. The network management system of claim 1, wherein to determine the one or more WAN link health assessments, the one or more processors are further configured to:

determine a baseline for a performance metric for a logical path of the first network device based on path data for the logical path of the first network device over a first period of time, wherein the performance metric comprises one of jitter, latency, or loss, and determine a failure state associated with logical path performance based on the performance metric degrading from the baseline for the performance metric over a second period of time; and wherein the one or more processors are configured to output a notification indicating the one of jitter, latency, or loss as a root cause of the failure state associated with logical path performance.

8. The network management system of claim 1, wherein the path data comprises periodically-reported data and event-driven data, wherein to obtain the path data of the first network device, the one or more processors are configured to:

periodically obtain a package of statistical data from the first network device including a header identifying the first network device and a payload including multiple statistics and data samples collected for each of the one or more logical paths during a previous periodical interval; and obtain event data from the first network device in response to an occurrence of at least one event at the first network device.

9. The network management system of claim 1, wherein the notification includes a recommendation to perform one or more remedial actions to address the root cause of the failure state indicated in the notification.

10. The network management system of claim 1, wherein the one or more processors are configured to invoke one or more remedial actions to address the root cause of the failure state indicated in the notification.

11. The network management system of claim 1, wherein, to output the notification, the one or more processors are configured to output the notification via a user interface for display on a user interface device of an administrator.

12. A method comprising:
obtaining, by a network management system, path data of a plurality of network devices operating as network gateways, wherein the path data of a first network device of the plurality of network devices is associated with one or more logical paths of a physical interface of the first network device established with one or more other network devices of the plurality of network devices over a wide area network (WAN);
determining, by the network management system and based on the path data, one or more WAN link health assessments, wherein determining the one or more WAN link health assessments comprises:
determining an amount of bandwidth requested by a user of the first network device as an operation metric for the physical interface of the first network device based on the path data of the first network device, and
determining a failure state associated with physical interface operation based on the amount of bandwidth requested by the user satisfying an oversubscription threshold associated with a subscription level of the user; and
outputting, by the network management system, a notification indicating congestion as a root cause of the failure state associated with physical interface operation.

13. The method of claim 12, wherein determining the one or more WAN link health assessments further comprises determining a failure state associated with service provider reachability based on one or more address resolution protocol (ARP) failure events or one or more dynamic host configuration protocol (DHCP) failure events included in the path data of the plurality of network devices, the method further comprising:
outputting a notification indicating the service provider as a root cause of the failure state associated with service provider reachability.

14. The method of claim 12, wherein determining the one or more WAN link health assessments further comprises determining a failure state associated with logical path performance based on one or more logical path down events included in the path data of the plurality of network devices, the method further comprising:
outputting a notification indicating the logical path as a root cause of the failure state associated with logical path performance.

15. The method of claim 12, wherein the failure state comprises a first failure state associated with physical interface operation, and wherein determining the one or more WAN link health assessments further comprises:
determining a number of error packets on the physical interface of the first network device to which a cable is connected as an operation metric for the physical interface based on the path data of the first network device; and
determining a second failure state associated with physical interface operation based on the number of error packets on the physical interface satisfying an error threshold,
the method further comprising outputting a notification indicating cable issues as a root cause of the second failure state associated with physical interface operation.

16. The method of claim 12, wherein determining the one or more WAN link health assessments further comprises:
determining a baseline for a performance metric for a logical path of the first network device based on path data for the logical path of the first network device over a first period of time, wherein the performance metric comprises one of jitter, latency, or loss; and
determining a failure state associated with logical path performance based on the performance metric degrading from the baseline for the performance metric over a second period of time,
the method further comprising outputting a notification indicating the one of jitter, latency, or loss as a root cause of the failure state associated with logical path performance.

17. The method of claim 12, further comprising invoking, by the network management system, one or more remedial actions to address the root cause of the failure state indicated in the notification.

18. The method of claim 12, wherein the failure state comprises a first failure state associated with physical interface operation, and wherein determining the one or more WAN link health assessments further comprises:
determining a signal strength for the physical interface of the first network device as an operation metric for the physical interface based on the path data of the first network device; and
determining a second failure state associated with physical interface operation based on the signal strength for the physical interface satisfying a weak signal threshold,
the method further comprising outputting a notification indicating signal strength as a root cause of the second failure state associated with physical interface operation.

19. The method of claim 12, wherein the path data comprises periodically-reported data and event-driven data, wherein obtaining the path data of the first network device comprises:
periodically obtaining a package of statistical data from the first network device including a header identifying the first network device and a payload including multiple statistics and data samples collected for each of the one or more logical paths during a previous periodical interval; and
obtaining event data from the first network device in response to an occurrence of at least one event at the first network device.

20. Non-transitory computer-readable storage media comprising instructions that, when executed, cause one or more processors to:
obtain path data of a plurality of network devices operating as network gateways, wherein the path data of a first network device of the plurality of network devices is associated with one or more logical paths of a physical interface of the first network device established with one or more other network devices of the plurality of network devices over a wide area network (WAN);
determine, based on the path data, one or more WAN link health assessments, wherein to determine the one or more WAN link health assessments, the instructions cause the one or more processors to:

determine an amount of bandwidth requested by a user of the first network device as an operation metric for the physical interface of the first network device based on the path data of the first network device, and determine a failure state associated with physical interface operation based on the amount of bandwidth requested by the user satisfying an oversubscription threshold associated with a subscription level of the user; and output a notification indicating congestion as a root cause of the failure state associated with physical interface operation.

\* \* \* \* \*